United States Patent
Jordan et al.

(10) Patent No.: US 11,049,019 B2
(45) Date of Patent: Jun. 29, 2021

(54) OPTIMIZING NEURAL NETWORKS FOR GENERATING ANALYTICAL OR PREDICTIVE OUTPUTS

(71) Applicant: EQUIFAX INC., Atlanta, GA (US)

(72) Inventors: Lewis Jordan, Atlanta, GA (US);
Matthew Turner, Cumming, GA (US);
Michael McBurnett, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 889 days.

(21) Appl. No.: 15/724,828

(22) Filed: Oct. 4, 2017

(65) Prior Publication Data
US 2018/0025273 A1    Jan. 25, 2018

Related U.S. Application Data

(63) Continuation-in-part of application No. PCT/US2016/024134, filed on Mar. 25, 2016.
(Continued)

(51) Int. Cl.
*G06N 3/08* (2006.01)
*G06N 20/00* (2019.01)
(Continued)

(52) U.S. Cl.
CPC .............. *G06N 3/084* (2013.01); *G06F 17/18* (2013.01); *G06N 3/04* (2013.01); *G06N 3/082* (2013.01);
(Continued)

(58) Field of Classification Search
None
See application file for complete search history.

(56) References Cited

U.S. PATENT DOCUMENTS 7,006,992 B1   2/2006  Packwood
7,280,980 B1  10/2007  Hoadley et al.
(Continued)

FOREIGN PATENT DOCUMENTS

EP       3274928      1/2018
WO    2016070096      5/2016
(Continued)

OTHER PUBLICATIONS

West, Neural network credit scoring models, Computers & Operations Research 27 (2000) pp. 1131-1152 (Year: 2000).*
(Continued)

*Primary Examiner* — Alan Chen
(74) *Attorney, Agent, or Firm* — Kilpatrick Townsend & Stockton LLP

(57) ABSTRACT

Certain embodiments involve generating or optimizing a neural network for generating analytical or predictive outputs. The neural network can be generated using a relationship between various predictor variables and an outcome (e.g., a condition's presence or absence). The neural network can be used to determine a relationship between each of the predictor variables and a response variable. The neural network can be optimized by iteratively adjusting the neural network such that a monotonic relationship exists between each of the predictor variables and the response variable. The optimized neural network can be used both for accurately determining response variables using predictor variables and determining adverse action codes for the predictor variables, which indicate an effect or an amount of impact that a given predictor variable has on the response variable. The neural network can be used to generate adverse action codes upon which consumer behavior can be modified to improve the response variable score.

19 Claims, 7 Drawing Sheets

Related U.S. Application Data

(60) Provisional application No. 62/139,445, filed on Mar. 27, 2015, provisional application No. 62/192,260, filed on Jul. 14, 2015.

(51) Int. Cl.
  *G06F 17/18* (2006.01)
  *G06Q 40/02* (2012.01)
  *G06Q 40/08* (2012.01)
  *G06N 3/04* (2006.01)
  *G06N 7/00* (2006.01)
  *G06Q 40/00* (2012.01)

(52) U.S. Cl.
  CPC .............. *G06N 7/005* (2013.01); *G06N 20/00* (2019.01); *G06Q 40/00* (2013.01); *G06Q 40/025* (2013.01); *G06Q 40/08* (2013.01)

(56) References Cited

U.S. PATENT DOCUMENTS

| | | | |
|---|---|---|---|
| 7,844,529 | B2 | 11/2010 | Ziade et al. |
| 7,881,994 | B1 | 2/2011 | An et al. |
| 8,086,523 | B1 | 12/2011 | Palmer |
| 10,133,980 | B2 | 11/2018 | Turner et al. |
| 10,535,009 | B2 | 1/2020 | Turner et al. |
| 10,558,913 | B1 | 2/2020 | Turner et al. |
| 2002/0072828 | A1 | 6/2002 | Turner et al. |
| 2004/0073096 | A1 | 4/2004 | Kates et al. |
| 2004/0103013 | A1 | 5/2004 | Jameson |
| 2004/0215551 | A1 | 10/2004 | Eder |
| 2005/0096950 | A1* | 5/2005 | Caplan ............. G06Q 10/06314 705/7.24 |
| 2005/0125259 | A1 | 6/2005 | Annappindi |
| 2005/0149463 | A1 | 7/2005 | Bolt et al. |
| 2007/0198252 | A1* | 8/2007 | Matsumoto ............. G06Q 10/04 704/219 |
| 2008/0208777 | A1* | 8/2008 | Stephens ................ G06N 20/00 706/12 |
| 2008/0301075 | A1 | 12/2008 | Bolt et al. |
| 2009/0192957 | A1 | 7/2009 | Subramanian et al. |
| 2010/0169256 | A1* | 7/2010 | Lee ............................ G06N 3/02 706/25 |
| 2011/0078073 | A1 | 3/2011 | Annappindi |
| 2012/0023006 | A1 | 1/2012 | Roser et al. |
| 2012/0066163 | A1 | 3/2012 | Balls et al. |
| 2012/0316981 | A1 | 12/2012 | Hoover et al. |
| 2012/0317058 | A1 | 12/2012 | Abhulimen |
| 2013/0332338 | A1 | 12/2013 | Yan et al. |
| 2014/0200953 | A1* | 7/2014 | Mun ........................ G06Q 40/08 705/7.28 |
| 2014/0324677 | A1 | 10/2014 | Walraven et al. |
| 2014/0337086 | A1 | 11/2014 | Asenjo et al. |
| 2015/0142713 | A1* | 5/2015 | Gopinathan ........... G06Q 40/00 706/14 |
| 2015/0235143 | A1* | 8/2015 | Eder ....................... G16H 50/50 706/12 |
| 2015/0269670 | A1 | 9/2015 | Gil et al. |
| 2016/0155069 | A1 | 6/2016 | Hoover et al. |
| 2016/0283686 | A1 | 9/2016 | Hu et al. |
| 2017/0024392 | A1* | 1/2017 | Shah ................. G06F 16/24552 |
| 2018/0068219 | A1 | 3/2018 | Turner et al. |
| 2018/0101766 | A1 | 4/2018 | He et al. |
| 2018/0121807 | A1 | 5/2018 | Wick et al. |
| 2018/0157661 | A1 | 6/2018 | Zoldi et al. |
| 2019/0066020 | A1* | 2/2019 | Allen .................... G06F 16/285 |
| 2019/0108603 | A1 | 4/2019 | Waslander et al. |
| 2019/0188562 | A1 | 6/2019 | Edwards et al. |
| 2019/0197444 | A1 | 6/2019 | Smith |
| 2019/0205791 | A1 | 7/2019 | Litherland et al. |

FOREIGN PATENT DOCUMENTS

| | | |
|---|---|---|
| WO | 2016160539 | 10/2016 |
| WO | 2018084867 A1 | 5/2018 |
| WO | 2019110980 A1 | 6/2019 |

OTHER PUBLICATIONS

Bekhet et al., Credit risk assessment model for Jordanian commercial banks: Neuralscoring approach, Review of Development Finance 4 (2014) pp. 20-28 (Year: 2014).*
AU2016243106, "First Examination Report", dated Jun. 11, 2020, 5 pages.
AU2019250275, "First Examination Report", dated May 26, 2020, 3 pages.
CA3,059,314, "Office Action", dated Apr. 9, 2020, 1 page.
EP16920636.4, "Extended European Search Report", dated May 29, 2020, 8 pages.
Archer, "Application of the Back Propagation Neural Network Algorithm with Monotonicity Constraints for Two-Group Classification Problems", Decision Sciences, vol. 24, No. 1, Jan. 1, 1993, pp. 60-75.
Daniels et al., "Monotone and Partially Monotone Neural Networks", IEEE Transactions on Neural Networks, vol. 21, No. 6, Jun. 1, 2010, pp. 906-917.
EP16773816.0, "Extended European Search Report", dated Nov. 14, 2018, 7 pages.
U.S. Appl. No. 16/173,427, "Non-Final Office Action", dated Apr. 8, 2019, 8 pages.
U.S. Appl. No. 16/173,427, "Notice of Allowance", dated Jun. 19, 2019, 5 pages.
U.S. Appl. No. 16/173,427, "Supplemental Notice of Allowability", dated Sep. 12, 2019, 2 pages.
European Patent Application No. 16773816.0, "Office Action", dated Dec. 6, 2019, 11 pages.
U.S. Appl. No. 16/340,256, "Notice of Allowance", dated Oct. 24, 2019, 10 pages.
Abdou, et al., "Would Credit Scoring Work for Islamic Finance? A Neural Network Approach", International Journal of Islamic and Middle Eastern Finance and Management, Apr. 14, 2014, 21 pages.
Archer, et al., "Empirical Characterization of Random Forest Variable Importance Measures", Computational Statistics & Data Analysis, vol. 52, Issue 4, Jan. 10, 2008, pp. 2249-2260.
Archer, et al., "Learning Bias in Neural Networks and an Approach to Controlling its Effects in Monotonic Classification", Institute of Electrical and Electronics Engineers Transactions on Pattern Analysis and Machine Intelligence, vol. 15, No. 9, Sep. 1993, 5 pages.
AU2016428862, "First Examination Report", dated Jul. 9, 2019, 5 pages.
Baesens, et al., "Neural Network Survival Analysis for Personal Loan Data", Universiteit Gent, Working Paper, Nov. 2004, 28 pages.
Bahrammirzaee, "A Comparative Survey of Artificial Intelligence Applications in Finance: Artificial Neural Networks, Expert System and Hybrid Intelligent Systems", Neural Computing and Applications, vol. 19, 2010, pp. 1165-1195.
Bekhet, et al., "Credit Risk Assessment Model for Jordanian Commercial Banks: Neural Scoring Approach", Review of Development Finance, vol. 4, Issue 1, 2014, pp. 20-28.
CA3,039,182, "Notice of Allowance", dated May 28, 2019, 1 page.
CA3,039,182, "Office Action", dated Jan. 6, 2020, 8 pages.
Cannon, "Monotone Multi-Layer Perceptron Neural Network", Package 'monmlp', Version 1.1.5, Dec. 5, 2017, pp. 1-11.
Chen, et al., "Constructing Credit Auditing and Control & Management Model with Data Mining Technique", Expert Systems with Applications, vol. 38, Issue 5, May 2011, pp. 5359-5365.
Chen, et al., "Credit Rating with a Monotonicity-Constrained Support Vector Machine Model", Expert Systems with Applications, vol. 41, Issue 16, Nov. 15, 2014, pp. 7235-7247.
Daniels, et al., "Application of MLP Networks to Bond Rating and House Pricing", Neural Computing & Applications, vol. 8, 1999, pp. 226-234.

(56) References Cited

OTHER PUBLICATIONS

Dembczynski, et al., "Learning Rule Ensembles for Ordinal Classification with Monotonicity Constraints", Fundamenta Informaticae, vol. 94, No. 2, 2009, pp. 163-178.
Duivesteijn, et al., "Nearest Neighbour Classification with Monotonicity Constraints", Joint European Conference on Machine Learning and Knowledge Discovery in Databases, vol. 5211, 2008, pp. 301-316.
Emel, et al., "A Credit Scoring Approach for the Commercial Banking Sector", Socio-Economic Planning Sciences, vol. 37, No. 2, Jun. 2003, pp. 103-123.
GB1915390.7, "Combined Search and Examination Report", dated Mar. 17, 2020, 5 pages.
Gismondi, et al., "Artificial Neural Networks for Infant Mortality Modelling", Computer Methods and Programs in Biomedicine, vol. 69, No. 3, Nov. 2002, pp. 237-249.
He, et al., "Deep Neural Network Acceleration Method Based on Sparsity", School of Communication and Information Engineering, Shanghai University, Shanghai, China, 2019, pp. 133-145.
Holmstrom, et al., "Using Additive Noise in Back-Propagation Training", Institute of Electrical and Electronics Engineers Transactions on Neural Networks, vol. 3, No. 1, Jan. 1992, pp. 24-38.
Islam, et al., "Application of Artificial Intelligence (Artificial Neural Network) to Assess Credit Risk: A Predictive Model for Credit Card Scoring", School of Management Blekinge Institute of Technology, 2009, 32 pages.
Kantchelian, et al., "Evasion and Hardening of Tree Ensemble Classifiers", An Abridged Version of This Paper Appears in Proceedings of the 33rd International Conference on Machine Learning, May 27, 2016, 11 pages.
Kao, et al., "A Bayesian Latent Variable Model with Classification and Regression Tree Approach for Behavior and Credit Scoring", Knowledge-Based Systems, vol. 36, Dec. 2012, pp. 245-252.
Kim, et al., "A Hybrid Deep Q-Network for the SVM Lagrangian", Information Science and Applications 2018, Jan. 2019, pp. 643-651.
Lang, "Monotonic Multi-layer Perceptron Networks as Universal Approximators", ICANN, 15th International Conference, Artificial Neural Networks: Formal Models and Their Applications, Part II, vol. 3697, Sep. 11-15, 2005, pp. 31-37.
Lee, et al., "Credit Scoring Using the Hybrid Neural Discriminant Technique", Expert Systems with Applications vol. 23, Issue 3, Oct. 1, 2002, pp. 245-254.
Lee, et al., "Methods of Inference and Learning for Performance Modeling of Parallel Applications", Proceedings of the 12th Association for Computing Machinery, Symposium on Principles and Practice of Parallel Programming, Mar. 2007, pp. 249-258.
Martens, et al., "Performance of Classification Models from a User Perspective", Decision Support Systems vol. 51, Issue 4, Nov. 2011, pp. 782-793.
Mughari, "Modeling Cost Contingency Allocation in the Gaza Strip Building Projects Using Multiple Regression Analysis", Thesis Submitted in Partial Fulfillment of the Requirements for the Degree of Master of Science in Construction Management, Apr. 2013, 155 pages.
PCT/US2016/060805, "International Preliminary Report on Patentability", dated May 16, 2019, 11 pages.
PCT/US2016/060805, "International Search Report and Written Opinion", dated Jul. 18, 2017, 14 pages.
Pederzoli, et al., "Modelling Credit Risk for Innovative SMEs: The Role of Innovation Measures", Journal of Financial Services Research, vol. 44, Aug. 2013, pp. 111-129.
Pendharkar, "A Computational Study on the Performance of Artificial Neural Networks Under Changing Structural Design and Data Distribution", European Journal of Operational Research, vol. 138, No. 1, Apr. 1, 2002, pp. 155-177.
Pendharkar, et al., "Technical Efficiency-Based Selection of Learning Cases to Improve Forecasting Accuracy of Neural Networks Under Monotonicity Assumption", Decision Support Systems, vol. 36, Issue 1, Sep. 2003, pp. 117-136.
Raghavan, et al., "Bit-Regularized Optimization of Neural Nets", Under review as a conference paper at International Conference on Learning Representations 2018, 2018, pp. 1-11.
Shao, et al., "Study on Credit Risk Assessment Model of Commercial Banks Based on BP Neural Network", Frontiers in Computer Education, vol. 133, 2012, pp. 1067-1075.
Sherrod, "DTREG Predictive Modeling Software", Available Online at: http://www.dtreg.com, 2003, 395 pages.
Shi, et al., "The Constrained Optimization Extreme Learning Machine Based on the Hybrid Loss Function for Regression", 2018 Tenth International Conference on Advanced Computational Intelligence (ICACI), Mar. 29-31, 2018, pp. 336-342.
Sill, "Monotonic Networks", Proceedings of the Conference on Advances in Neural Information Processing Systems 10, 1997, pp. 661-667.
Silva, et al., "Differential Scorecards for Binary and Ordinal Data", Intelligent Data Analysis, vol. 19, No. 6, 2015, pp. 1-26.
Srinivasan, et al., "Exponentiated Backpropagation Algorithm for Multilayer Feedforward Neural Networks", International Conference on Neural Information Processing, vol. 1, 2002, 5 pages.
Strobl, et al., "Conditional Variable Importance for Random Forests", BMC Bioinformatics, vol. 9, No. 307, 2008, 11 pages.
Trinkle, et al., "Interpretable Credit Model Development via Artificial Neural Networks", Intelligent System in Accounting, Finance and Management, vol. 15, Issue 3-4, 2007, pp. 123-147.
Tsai, et al., "Feature Selection in Bankruptcy Prediction", Knowledge-Based Systems, vol. 22, No. 2, Mar. 2009, pp. 120-127.
Van Der Laan, "Statistical Inference for Variable Importance", The International Journal of Biostatistics, vol. 2, Issue 1, Feb. 20, 2006, 33 pages.
Velikova, et al., "Solving Partially Monotone Problems with Neural Networks", World Academy of Science, Engineering and Technology, International Journal of Computer and Information Engineering, vol. 1, No. 12, 2007, pp. 4043-4048.
Wagner, "The Use of Credit Scoring in the Mortgage Industry", Journal of Financial Services Marketing, vol. 9, No. 2, Aug. 13, 2004, pp. 179-183.
Wang, et al., "An Application of Back Propagation Neural Network for the Steel Stress Detection Based on Barkhausen Noise Theory", NDT & E International, vol. 55, Apr. 2013, pp. 9-14.
Wang, "Generating Fuzzy Membership Functions: A Monotonic Neural Network Model", Fuzzy Sets and Systems, vol. 61, Issue 1, Jan. 10, 1994, pp. 71-81.
Wang, "Neural Network Techniques for Monotonic Nonlinear Models", Computers & Operations Research, vol. 21, Issue 2, Feb. 1994, pp. 143-154.
Wang, "The Neural Network Approach to Input-Output Analysis for Economic Systems", Neural Computing & Applications, vol. 10, Issue 1, 2001, pp. 22-28.
West, "Neural Network Credit Scoring Models", Computers & Operations Research, vol. 27, Sep. 2000, pp. 1131-1152.
Zhang, et al., "Feedforward Networks with Monotone Constraints", IEEE, International Joint Conference on Neural Networks, vol. 3, Jul. 10-16, 1999, pp. 1820-1823.
Zhang, et al., "Outlier-Robust Extreme Learning Machine for Regression Problems", Neurocomputing, vol. 151, Mar. 3, 2015, pp. 1519-1527.
Zhu, "Fraud Detection in Bank Transactions: Ensemble of Local Sparse Linear Classifiers", Department of Mathematics and Computer Science Data Mining Group, Aug. 31, 2017, 87 pages.
EP16773816.0, "Summons to Attend Oral Proceeding", Apr. 17, 2020, 12 pages.
U.S. Appl. No. 15/560,401, "Corrected Notice of Allowability", dated Sep. 11, 2018, 5 pages.
U.S. Appl. No. 15/560,401, "Corrected Notice of Allowability", dated Sep. 5, 2018, 18 pages.
U.S. Appl. No. 15/560,401, "Notice of Allowance", dated Aug. 7, 2018, 22 pages.
Cybenko, "Approximation by Superpositions of a Sigmoidal Function Mathematics", Mathematics of Control,Signals, and Systems, vol. 2, 1989, pp. 303-314.
Hand et al., "Justifying Adverse Actions With New Scorecard Technologies", Journal of Financial Transformation, 2009, 5 pages.

(56) References Cited

OTHER PUBLICATIONS

Haykin, "Feedforward Neural Networks: An Introduction", 1998, 16 pages.
Hu et al., "An Integrative Framework for Intelligent Software Project Risk Planning", Decision Support Systems, vol. 55, Issue 4, Nov. 2013, pp. 927-937.
Mahul et al., "Training Feed-Forward Neural Networks with Monotonicity Requirements", Technical Report, Research Report RR-04-11, LIMOS/CNRS 6158, Jun. 2004, 14 pages.
PCT/US2016/024134, "International Preliminary Report on Patentability", dated Oct. 12, 2017, 11 pages.
PCT/US2016/024134, "International Search Report and Written Opinion", dated Jul. 12, 2016, 12 pages.
Rouhani-Kalleh, "Analysis, Theory and Design of Logistic Regression Classifiers Used for Very Large Scale Data Mining", 2006, 96 pages.
Shang et al., "Applying Fuzzy Logic to Risk Assessment and Decision-Making", Society of Actuaries, Available Online at: https://www.soa.org/Research/Research-Projects/Risk-Management/research-2013-fuzzyologic.aspx, Nov. 2013, 59 pages.
EP19204970.8, "Extended European Search Report", dated Jul. 27, 2020, 13 pages.
Equifax, "Explainable AI IN Practice Using NDT Gen 3 with UK CRA Data", Credit Scoring and Credit Control XVI, Aug. 30, 2019, 13 pages.
U.S. Appl. No. 17/015,056, "Non-Final Office Action", dated Dec. 11, 2020, 9 pages.
U.S. Appl. No. 17/019,098, "Notice of Allowance", dated Dec. 4, 2020, 9 pages.
AU2019250275, "Second Examination Report", dated Oct. 13, 2020, 3 pages.
U.S. Appl. No. 16/152,936, "Notice of Allowance", dated Dec. 21, 2020, 9 pages.
U.S. Appl. No. 17/076,588, "Notice of Allowance", dated Jan. 6, 2021, 11 pages.
Ciampi, et al., "Small Enterprise Default Prediction Modeling through Artificial Neural Networks: An Empirical Analysis of Italian Small Enterprises", Journal of Small Business Management, vol. 51, Issue 1, 2013, pp. 23-45.

* cited by examiner

OPTIMIZING NEURAL NETWORKS FOR GENERATING ANALYTICAL OR PREDICTIVE OUTPUTS

CROSS-REFERENCE TO RELATED APPLICATIONS

This disclosure is a continuation-in-part of International Patent Application No. PCT/US2016/024134, entitled "Optimizing Neural Networks for Risk Assessment" and filed Mar. 25, 2016, which claims priority to U.S. Provisional Application No. 62/139,445, entitled "Optimizing Neural Networks for Risk Assessment," filed Mar. 27, 2015 and U.S. Provisional Application No. 62/192,260, entitled "Optimizing Neural Networks for Risk Assessment," filed Jul. 14, 2015, the entireties of each of which is hereby incorporated by reference.

TECHNICAL FIELD

The present disclosure relates generally to artificial intelligence. More specifically, but not by way of limitation, this disclosure relates to machine learning using artificial neural networks and emulating intelligence to optimize neural networks for assessing risk, predicting entity behaviors, or modeling other predictive or analytical outputs.

BACKGROUND

In machine learning, artificial neural networks can be used to perform one or more functions (e.g., acquiring, processing, analyzing, and understanding various inputs in order to produce an output that includes numerical or symbolic information). A neural network includes one or more algorithms and interconnected nodes that exchange data between one another. The nodes can have numeric weights that can be tuned based on experience, which makes the neural network adaptive and capable of learning. For example, the numeric weights can be used to train the neural network such that the neural network can perform the one or more functions on a set of inputs and produce an output or variable that is associated with the set of inputs.

SUMMARY

Various embodiments of the present disclosure provide systems and methods for optimizing a neural network for generating a predictive or analytical output (e.g., a risk assessment). The neural network can model relationships between various predictor variables and various outcomes modeled using one or more response variables. Examples of outcomes include, but are not limited to, a positive outcome indicating the satisfaction of a condition and a negative outcome indicating a failure to satisfy a condition. The neural network can be optimized by iteratively adjusting the neural network such that a monotonic relationship exists between each of the predictor variables and the response variable. In some aspects, the optimized neural network can be used both for accurately determining response variables using predictor variables and determining explanatory data for the predictor variables, which indicates an effect or an amount of impact that a given predictor variable has on the response variable. An example of explanatory data is an adverse action code.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
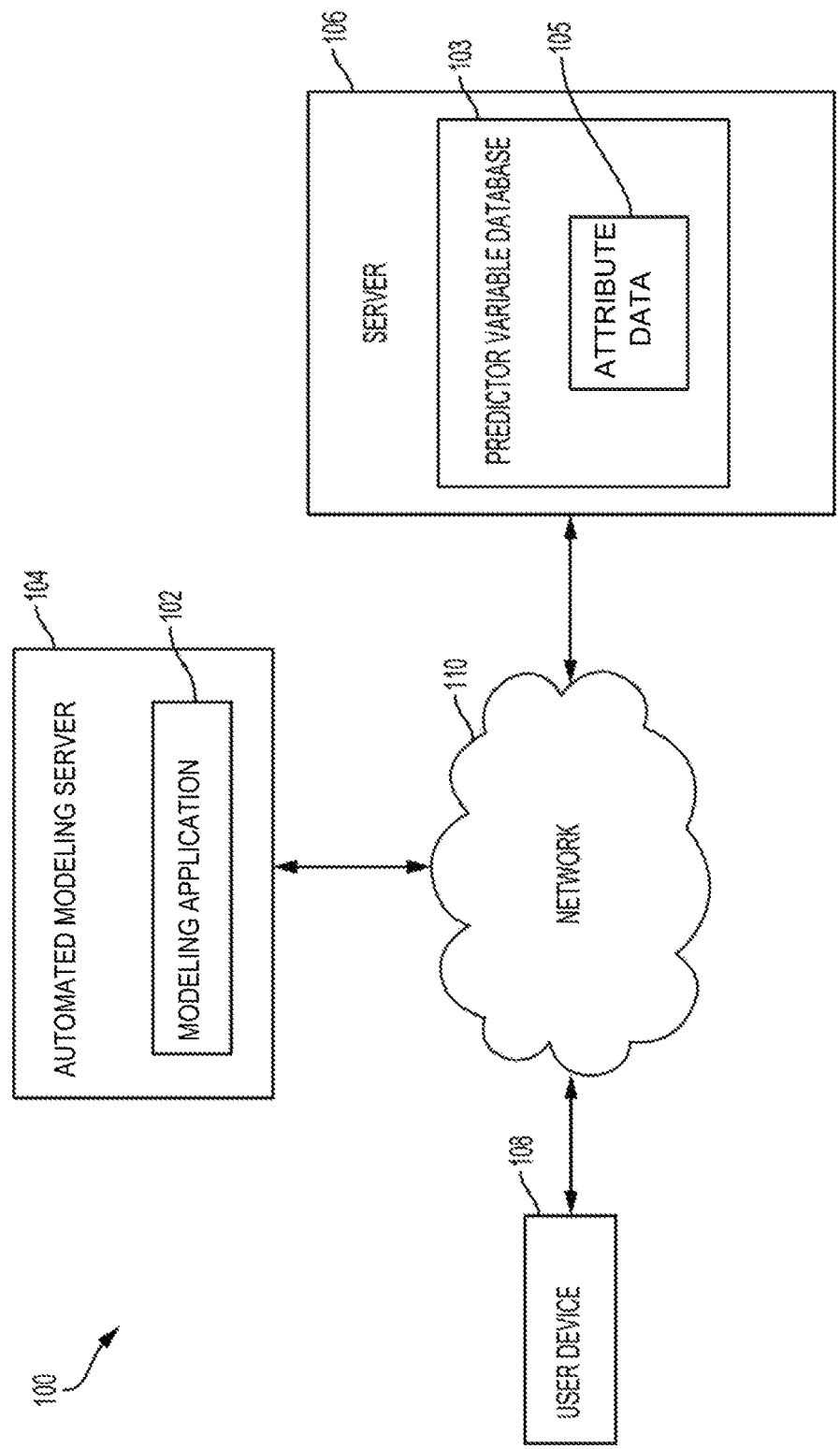
FIG. 1 is a block diagram depicting an example of a computing environment in which an automated modeling application operates, according to certain aspects of the present disclosure.

Certain aspects and features of the present disclosure are directed to optimizing a neural network for generating analytical or predictive outputs. The neural network can include one or more computer-implemented algorithms or models used to perform a variety of functions including, for example, obtaining, processing, and analyzing various predictor variables in order to output an expected value of a response variable (e.g., a risk indicator value) associated with the predictor variables. The neural network can be represented as one or more hidden layers of interconnected nodes that can exchange data between one another. The layers may be considered hidden because they may not be directly observable in the normal functioning of the neural network. The connections between the nodes can have numeric weights that can be tuned based on experience. Such tuning can make neural networks adaptive and capable of "learning." Tuning the numeric weights can involve adjusting or modifying the numeric weights to increase the accuracy of a risk indicator, prediction of entity behavior, or other response variable provided by the neural network. In some aspects, the numeric weights can be tuned through a process referred to as training.

In some aspects, an automated modeling application can generate or optimize a neural network for generating analytical or predictive outputs. For example, the automated modeling application can receive various predictor variables and determine a relationship between each predictor variable and an outcome such as, but not limited to, a positive outcome indicating that a condition is satisfied or a negative outcome indicating that the condition is not satisfied. The automated modeling application can generate the neural network using the relationship between each predictor variable and the outcome. In some aspects, an outcome can have a value from a set of discrete values. In other aspects, an outcome can have a value from a set of continuous values. The neural network can then be used to determine a relationship between each of the predictor variables and a risk indicator, prediction of entity behavior, or other response variable.

Optimizing the neural network can include iteratively adjusting the number of nodes in the neural network such that a monotonic relationship exists between each of the predictor variables and the risk indicator, prediction of entity behavior, or other response variable. Examples of a monotonic relationship between a predictor variable and a response variable include a relationship in which a value of the response variable increases as the value of the predictor variable increases or a relationship in which the value of the response variable decreases as the value of the predictor variable increases. The neural network can be optimized such that a monotonic relationship exists between each predictor variable and the response variable. The monotonicity of these relationships can be determined based on a rate of change of the value of the response variable with respect to each predictor variable.

Optimizing the neural network in this manner can allow the neural network to be used both for accurately determining response variable values (e.g., risk indicators, predictions of entity behavior, etc.) using predictor variables and determining adverse action codes for the predictor variables. For example, an optimized neural network can be used for both determining a credit score associated with an entity (e.g., an individual or business) based on predictor variables associated with the entity. A predictor variable can be any variable predictive of a behavior that is associated with an entity. Any suitable predictor variable that is authorized for use by an appropriate legal or regulatory framework may be used. Examples of predictor variables include, but are not limited to, variables indicative of one or more demographic characteristics of an entity (e.g., age, gender, income, etc.), variables indicative of prior actions or transactions involving the entity (e.g., information that can be obtained from credit files or records, financial records, consumer records, or other data about the activities or characteristics of the entity), variables indicative of one or more behavioral traits of an entity, etc. For example, the neural network can be used to determine the amount of impact that each predictor variable has on the value of the response variable after determining a rate of change of the value of the response variable with respect to each predictor variable. An adverse action code can indicate an effect or an amount of impact that a given predictor variable has on the value of the credit score or other response variable (e.g., the relative negative impact of the predictor variable on a credit score or other response variable).

In some aspects, using and optimizing artificial neural networks, can provide performance improvements as compared to, for example, logistic regression techniques to develop reports that quantify risks associated with individuals or other entities. For example, in a credit scoring system, credit scorecards and other credit reports used for credit risk management can be generated using logistic regression models, where decision rules are used to determine adverse action code assignments that indicate the rationale for one or more types of information in a credit report (e.g., the aspects of an entity that resulted in a given credit score). Adverse action code assignment algorithms used for logistic regression may not be applicable in machine-learning techniques due to the modeled non-monotonicities of the machine-learning techniques. Adverse action code assignments may be inaccurate if performed without accounting for the non-monotonicity. By contrast, neural networks can be optimized to account for non-monotonicity, thereby allowing the neural network to be used for providing accurate credit scores and associated adverse action codes.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram depicting an example of a computing environment 100 in which an automated modeling application 102 operates. Computing environment 100 can include the automated modeling application 102, which is executed by an automated modeling server 104. The automated modeling application 102 can include one or more modules for acquiring, processing, and analyzing data to optimize a neural network for generating response variable values (e.g., assessing risk through a credit score) and identifying contributions of certain predictors to the response variable values (e.g., adverse action codes for the credit score). In some aspects, a response variable can be a random variable from an exponential family of distributions. The automated modeling application 102 can obtain the data used for generating analytical or predictive outputs from the predictor variable database 103, the user device 108, or any other source. In some aspects, the automated modeling server 104 can be a specialized computer or other machine that processes data in computing environment 100 for generating or optimizing a neural network for assessing risk, predicting an entity behavior, or other computing response variable values.

The computing environment 100 can also include a server 106 that hosts a predictor variable database 103, which is accessible by a user device 108 via the network 110. The predictor variable database 103 can store data to be accessed or processed by any device in the computing environment 100 (e.g., the automated modeling server 104 or the user device 108). The predictor variable database 103 can also store data that has been processed by one or more devices in the computing environment 100.

The predictor variable database 103 can store a variety of different types of data organized in a variety of different ways and from a variety of different sources. For example, the predictor variable database 103 can include attribute data 105. The attribute data 105 can be any data that can be used for generating analytical or predictive outputs. As an example, the attribute data can include data obtained from credit records, credit files, financial records, or any other data that can be used to for assessing a risk, modeling a predicted behavior, or modeling some other outcome.

The user device 108 may include any computing device that can communicate with the computing environment 100. For example, the user device 108 may send data to the computing environment or a device in the computing environment (e.g., the automated modeling application 102 or the predictor variable database 103) to be stored or processed. In some aspects, the network device is a mobile device (e.g., a mobile telephone, a smartphone, a PDA, a tablet, a laptop, etc.). In other examples, the user device 108 is a non-mobile device (e.g., a desktop computer or another type of network device).

Communication within the computing environment 100 may occur on, or be facilitated by, a network 110. For example, the automated modeling application 102, the user device 108, and the predictor variable database 103 may communicate (e.g., transmit or receive data) with each other via the network 110. The computing environment 100 can include one or more of a variety of different types of networks, including a wireless network, a wired network, or a combination of a wired and wireless network. Although the computing environment 100 of FIG. 1 is depicted as having a certain number of components, in other examples, the computing environment 100 has any number of additional or alternative components. Further, while FIG. 1 illustrates a particular arrangement of the automated modeling application 102, user device 108, predictor variable database 103, and network 110, various additional arrangements are possible. For example, the automated modeling application 102 can directly communicate with the predictor variable database 103, bypassing the network 110. Furthermore, while FIG. 1 illustrates the automated modeling application 102 and the predictor variable database 103 as separate components on different servers, in some embodiments, the automated modeling application 102 and the predictor variable database 103 are part of a single system hosted on one or more servers.

Figure 2:
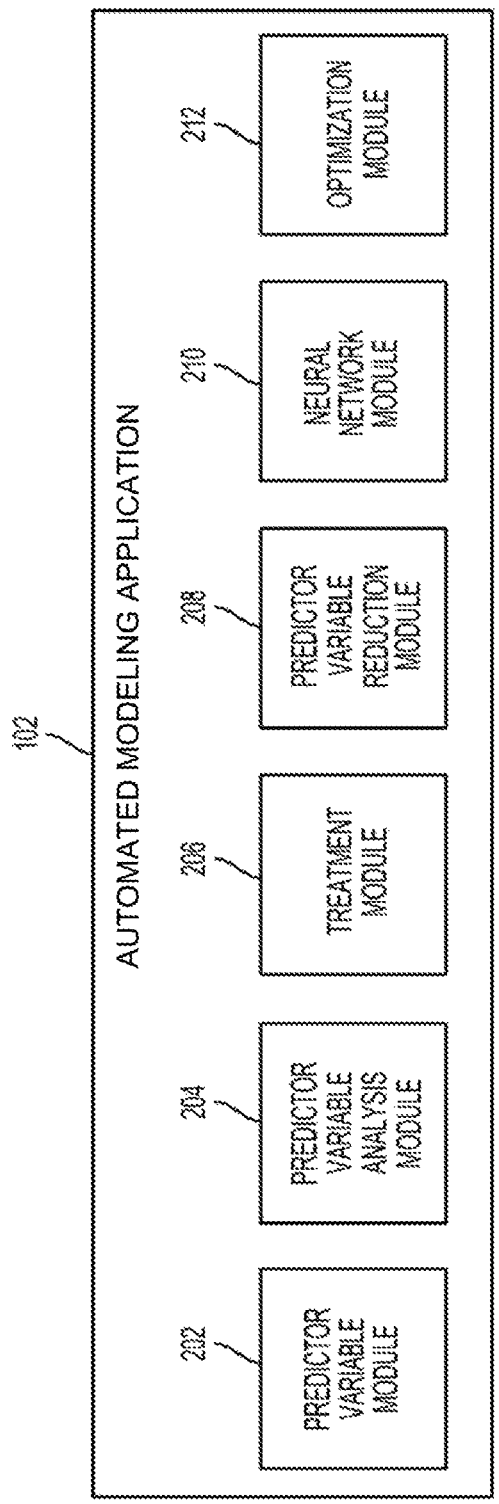
FIG. 2 is a block diagram depicting an example of the automated modeling application of FIG. 1, according to certain aspects of the present disclosure.

The automated modeling application can include one or more modules for generating and optimizing a neural network. For example, FIG. 2 is a block diagram depicting an example of the automated modeling application 102 of FIG. 1. The automated modeling application 102 depicted in FIG. 2 can include various modules 202, 204, 206, 208, 210, 212 for generating and optimizing a neural network for assessing risk, predicting entity behavior, or otherwise computing response variable values. Each of the modules 202, 204, 206, 208, 210, 212 can include one or more instructions stored on a computer-readable storage medium and executable by processors of one or more computing devices (e.g., the automated modeling server 104). Executing the instructions causes the automated modeling application 102 to generate a neural network and optimize the neural network.

The automated modeling application 102 can use the predictor variable module 202 for obtaining or receiving data. In some aspects, the predictor variable module 202 can include instructions for causing the automated modeling application 102 to obtain or receive the data from a suitable data structure, such as the predictor variable database 103 of FIG. 1. The predictor variable module 202 can use any predictor variables or other data suitable for assessing one or more risks associated with an entity, predicting the entity's behavior, or otherwise computing response variable values with respect to the entity. Examples of predictor variables can include data associated with an entity that describes prior actions or transactions involving the entity (e.g., information that can be obtained from credit files or records, financial records, consumer records, or other data about the activities or characteristics of the entity), behavioral traits of the entity, demographic traits of the entity, or any other traits of that may be used to compute analytical or predictive outputs associated with the entity. In some aspects, predictor variables can be obtained from credit files, financial records, consumer records, etc.

In some aspects, the automated modeling application 102 can include a predictor variable analysis module 204 for analyzing various predictor variables. The predictor variable analysis module 204 can include instructions for causing the automated modeling application 102 to perform various operations on the predictor variables for analyzing the predictor variables.

For example, the predictor variable analysis module 204 can perform an exploratory data analysis, in which the predictor variable analysis module 204 analyzes a distribution of one or more predictor variables and determines a bivariate relationship or correlation between the predictor variable and an odds index or a good/bad odds ratio. The odds index can indicate a ratio of positive or negative outcomes associated with the predictor variable. A positive outcome can indicate that a condition has been satisfied. A negative outcome can indicate that the condition has not been satisfied. As an example, the predictor variable analysis module 204 can perform the exploratory data analysis to identify trends associated with predictor variables and a good/bad odds ratio (e.g., the odds index).

In this example, the bivariate relationship between the predictor variable and the odds index indicates a measure of the strength of the relationship between the predictor variable and the odds index. In some aspects, the bivariate relationship between the predictor variable and the odds index can be used to determine (e.g., quantify) a predictive strength of the predictor variable with respect to the odds index. The predictive strength of the predictor variable indicates an extent to which the predictor variable can be used to accurately predict a positive or negative outcome or a likelihood of a positive or negative outcome occurring based on the predictor variable.

For instance, the predictor variable can be a number of times that an entity (e.g., a consumer) fails to pay an invoice within 90 days. A large value for this predictor variable (e.g., multiple delinquencies) can result in a high number of negative outcomes (e.g., default on the invoice), which can decrease the odds index (e.g., result in a higher number of adverse outcomes, such as default, across one or more consumers). As another example, a small value for the predictor variable (e.g., fewer delinquencies) can result in a high positive outcome (e.g., paying the invoice on time) or a lower number of negative outcomes, which can increase the odds index (e.g., result in a lower number of adverse outcomes, such as default, across one or more consumers). The predictor variable analysis module 204 can determine and quantify an extent to which the number of times that an entity fails to pay an invoice within 90 days can be used to accurately predict a default on an invoice or a likelihood that that will default on the invoice.

In some aspects, the predictor variable analysis module 204 can develop an accurate model of a relationship between one or more predictor variables and one or more positive or negative outcomes. The model can indicate a corresponding relationship between the predictor variables and an odds index or a corresponding relationship between the predictor variables and a response variable (e.g., a credit score or other risk indicator associated with an entity, a prediction of spending or other entity behavior, etc.). As an example, the automated modeling application 102 can develop a model that accurately indicates that a consumer having more financial delinquencies is a higher risk than a consumer having fewer financial delinquencies.

The automated modeling application 102 can also include a treatment module 206 for causing a relationship between a predictor variable and an odds index to be monotonic. Examples of a monotonic relationship between the predictor variable and the odds index include a relationship in which a value of the odds index increases as a value of the predictor variable increases or a relationship in which the value of the odds index decreases as the value the predictor variable increases. In some aspects, the treatment module 206 can execute one or more algorithms that apply a variable treatment, which can cause the relationship between the predictor variable and the odds index to be monotonic. Examples of functions used for applying a variable treatment include (but are not limited to) binning, capping or flooring, imputation, substitution, recoding variable values, etc.

The automated modeling application 102 can also include a predictor variable reduction module 208 for identifying or determining a set of predictor variables that have a monotonic relationship with one or more odds indices. For example, the treatment module 206 may not cause a relationship between every predictor variable and the odds index to be monotonic. In such examples, the predictor variable reduction module 208 can select a set of predictor variables with monotonic relationships to one or more odds indices. The predictor variable reduction module 208 can execute one or more algorithms that apply one or more preliminary variable reduction techniques for identifying the set of predictor variables having the monotonic relationship with the one or more odds indices. Preliminary variable reduction techniques can include rejecting or removing predictor variables that do not have a monotonic relationship with one or more odds indices.

In some aspects, the automated modeling application 102 can include a neural network module 210 for generating a neural network. The neural network module 210 can include instructions for causing the automated modeling application 102 to execute one or more algorithms to generate the neural network. The neural network can include one or more computer-implemented algorithms or models. Neural networks can be represented as one or more layers of interconnected nodes that can exchange data between one another. The connections between the nodes can have numeric weights that can be tuned based on experience. Such tuning can make neural networks adaptive and capable of learning. Tuning the numeric weights can increase the accuracy of output provided by the neural network. In some aspects, the automated modeling application 102 can tune the numeric weights in the neural network through a process referred to as training (e.g., using the optimization module 212 described below).

In some aspects, the neural network module 210 includes instructions for causing the automated modeling application 102 to generate a neural network using a set of predictor variables having a monotonic relationship with an associated odds index. For example, the automated modeling application 102 can generate the neural network such that the neural network models the monotonic relationship between one or more odds indices and the set of predictor variables identified by the predictor variable reduction module 208.

The automated modeling application 102 can generate any type of neural network for assessing risk, predicting entity behavior, or otherwise computing response variable values. In some examples, the automated modeling application can generate a neural network based on one or more criteria or rules obtained from industry standards.

For example, the automated modeling application can generate a feed-forward neural network. A feed-forward neural network can include a neural network in which every node of the neural network propagates an output value to a subsequent layer of the neural network. For example, data may move in one direction (forward) from one node to the next node in a feed-forward neural network.

The feed-forward neural network can include one or more hidden layers of interconnected nodes that can exchange data between one another. The layers may be considered hidden because they may not be directly observable in the normal functioning of the neural network. For example, input nodes corresponding to predictor variables can be observed by accessing the data used as the predictor variables, and nodes corresponding to risk assessments or other response variables can be observed as outputs of an algorithm using the neural network. But the nodes between the predictor variable inputs and the response variable outputs may not be readily observable, though the hidden layer is a standard feature of neural networks.

In some aspects, the automated modeling application 102 can generate the neural network and use the neural network for both determining a response variable (e.g., a credit score) based on predictor variables and determining an impact or an amount of impact of the predictor variable on the response variable. For example, the automated modeling application 102 can include an optimization module 212 for optimizing neural network generated using the neural network module 210 so that the both the response variable and the impact of a predictor variable can be identified using the same neural network.

The optimization module 212 can optimize the neural network by executing one or more algorithms that apply a coefficient method to the generated neural network to modify or train the generated neural network. In some aspects, the coefficient method is used to analyze a relationship between, for example, a credit score or other response variable and one or more predictor variables used to obtain the credit score. The coefficient method can be used to determine how one or more predictor variables influence the response variable (e.g., a credit score or other risk indicator, a prediction of entity behavior, etc.). In one example, the coefficient method can ensure that a modeled relationship between the predictor variables and the credit score has a trend that matches or otherwise corresponds to a trend identified using an exploratory data analysis for a set of sample consumer data.

In some aspects, the outputs from the coefficient method can be used to adjust the neural network. For example, if the exploratory data analysis indicates that the relationship between one of the predictor variables and an odds ratio (e.g., an odds index) is positive, and the neural network shows a negative relationship between a predictor variable and a credit score, the neural network can be modified. For example, the predictor variable can be eliminated from the neural network or the architecture of the neural network can be changed (e.g., by adding or removing a node from a hidden layer or increasing or decreasing the number of hidden layers).

For example, the optimization module 212 can include instructions for causing the automated modeling application 102 to determine a relationship between a risk indicator, prediction of entity behavior, or other response variable and one or more predictor variables used to determine the risk indicator. As an example, the optimization module 212 can determine whether a relationship between each of the predictor variables and a risk indicator or other response variable is monotonic. A monotonic relationship exists between each of the predictor variables and the response variable either when a value of the response variable increases as a value of each of the predictor variables increases or when the value of the response variable decreases as the value of each of the predictor variable increases.

In some aspects, the optimization module 212 includes instructions for causing the automated modeling application to determine that predictor variables that have a monotonic relationship with the response variable are valid for the neural network. For any predictor variables that are not valid (e.g., do not have a monotonic relationship with the response variable), the optimization module 212 can cause the automated modeling application 102 to optimize the neural network by iteratively adjusting the predictor variables, the number of nodes in the neural network, or the number of hidden layers in the neural network until a monotonic relationship exists between each of the predictor variables and the response variable. Adjusting the predictor variables can include eliminating the predictor variable from the neural network. Adjusting the number of nodes in the neural network can include adding or removing a node from a hidden layer in the neural network. Adjusting the number of hidden layers in the neural network can include adding or removing a hidden layer in the neural network.

The optimization module 212 can include instructions for causing the automated modeling application 102 to terminate the iteration if one or more conditions are satisfied. In one example, the iteration can terminate if the monotonic relationship exists between each of the predictor variables and the response variable. In another example, the iteration can terminate if a relationship between each of the predictor variables and the response variable corresponds to a relationship between each of the predictor variables and an odds index (e.g., the relationship between each of the predictor variables and the odds index using the predictor variable analysis module 204 as described above). Additionally or alternatively, the iteration can terminate if the modeled relationship between the predictor variables and the response variable has a trend that is the same as or otherwise corresponds to a trend identified using the exploratory data analysis (e.g., the exploratory data analysis conducted using the predictor variable analysis module 204).

In some aspects, the optimization module 212 includes instructions for causing the automated modeling application 102 to determine an effect or an impact of each predictor variable on the response variable after the iteration is terminated. For example, the automated modeling application 102 can use the neural network to incorporate non-linearity into one or more modeled relationships between each predictor variable and the response variable. The optimization module 212 can include instructions for causing the automated modeling application 102 to determine a rate of change (e.g., a derivative or partial derivative) of the response variable with respect to each predictor variable through every path in the neural network that each predictor variable can follow to affect the response variable. In some aspects, the automated modeling application 102 determines a sum of derivatives for each connection of a predictor variable with the response variable. In some aspects, the automated modeling application can analyze the partial derivative for each predictor variable across a range of interactions within a neural network model and a set of sample data for the predictor variable. An example of sample data is a set of values of the predictor variable that are obtained from credit records or other consumer records. The automated modeling application can determine that the combined non-linear influence of each predictor variable is aligned with decision rule requirements used in a relevant industry (e.g., the credit reporting industry). For example, the automated modeling application can identify adverse action codes from the predictor variables and the consumer can modify his or her behavior relative to the adverse action codes such that the consumer can improve his or her credit score.

If the automated modeling application 102 determines that the rate of change is monotonic (e.g., that the relationships modeled via the neural network match the relationships observed via an exploratory data analysis), the automated modeling application 102 may use the neural network to determine and output an adverse action code for one or more of the predictor variables. The adverse action code can indicate the effect or the amount of impact that a given predictor variable has on the response variable. In some aspects, the optimization module 212 can determine a rank of each predictor variable based on the impact of each predictor variable on the response variable. The automated modeling application 102 may output the rank of each predictor variable.

Optimizing the neural network in this manner can allow the automated modeling application 102 to use the neural network to accurately determine response variables using predictor variables and accurately determine an associated adverse action code for each of the predictor variables. The automated modeling application 102 can output one or more of the response variable and the adverse code associated with each of the predictor variables. In some applications used to generate credit decisions, the automated modeling application 102 can use an optimized neural network to provide recommendations to a consumer based on adverse action codes. The recommendations may indicate one or more actions that the consumer can take to improve the change the response variable (e.g., improve a credit score).

Figure 3:
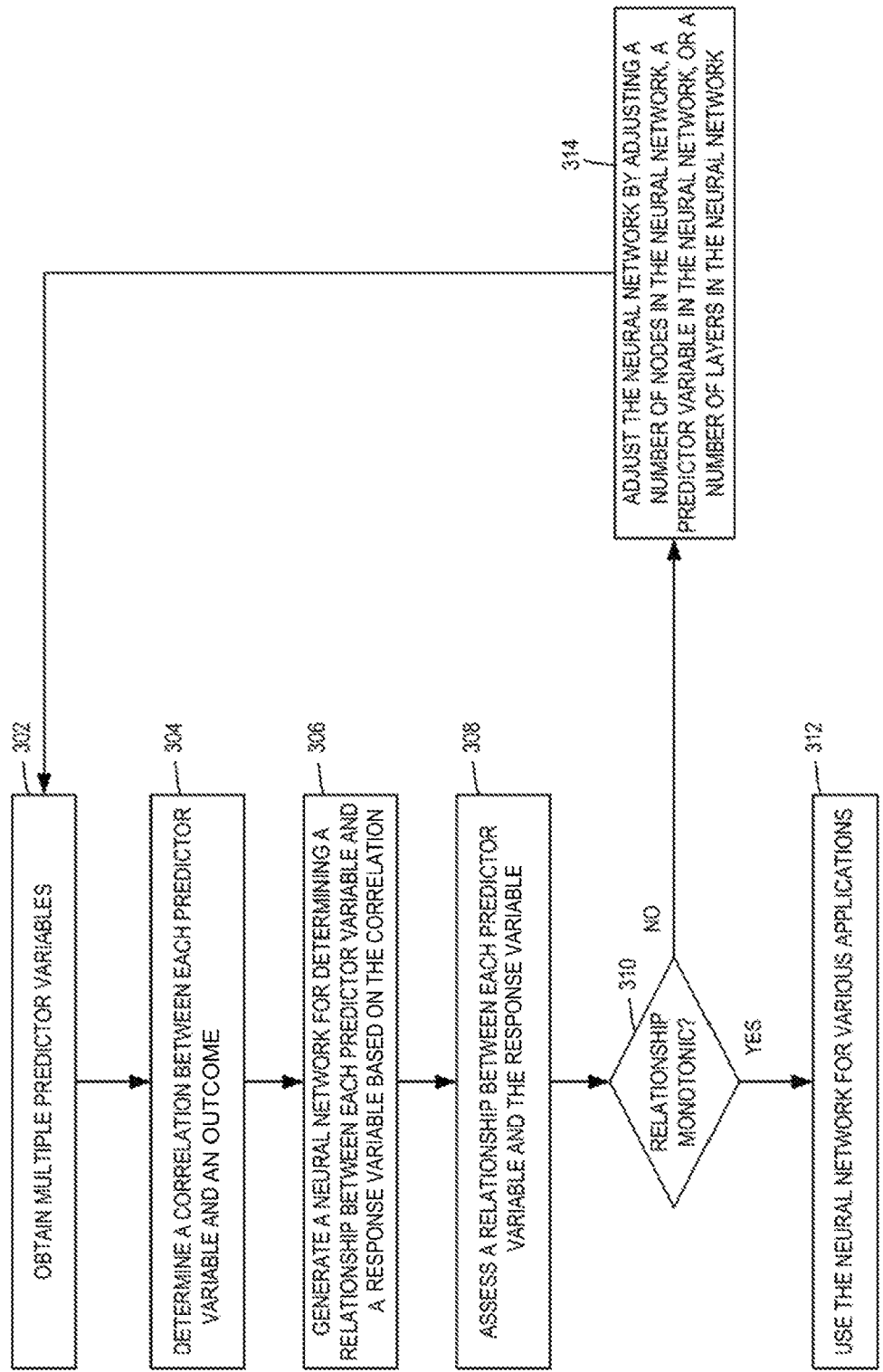
FIG. 3 is a flow chart depicting an example of a process for optimizing a neural network for generating analytical or predictive outputs, according to certain aspects of the present disclosure.

FIG. 3 is a flow chart depicting an example of a process for optimizing a neural network for generating analytical or predictive outputs. For illustrative purposes, the process is described with respect to the examples depicted in FIGS. 1 and 2. Other implementations, however, are possible.

In block 302, multiple predictor variables are obtained. In some aspects, the predictor variables are obtained by an automated modeling application (e.g., the automated modeling application 102 using the predictor variable analysis module 204 of FIG. 2). For example, the automated modeling application can obtain the predictor variables from a predictor variable database (e.g., the predictor variable database 103 of FIG. 1). In some aspects, the automated modeling application can obtain the predictor variables from any other data source. Examples of predictor variables can include data associated with an entity that describes prior actions or transactions involving the entity (e.g., information that can be obtained from credit files or records, financial records, consumer records, or other data about the activities or characteristics of the entity), behavioral traits of the entity, demographic traits of the entity, or any other traits of that may be used to predict risks, behaviors, or other modeled outputs (i.e., modeled expected values of response variables) associated with the entity. In some aspects, predictor variables can be obtained from credit files, financial records, consumer records, etc.

In block 304, a correlation between each predictor variable and a positive or negative outcome is determined. In some aspects, the automated modeling application determines the correlation (e.g., using the predictor variable analysis module 204 of FIG. 2). For example, the automated modeling application can perform an exploratory data analysis on a set of candidate predictor variables, which involves analyzing each predictor variable and determines a bivariate relationship or correlation between each predictor variable and an odds index. The odds index indicates a ratio of positive or negative outcomes associated with the predictor variable. In some aspects, the bivariate relationship between the predictor variable and the odds index can be used to determine (e.g., quantify) a predictive strength of the predictor variable with respect to the odds index. The predictive strength of the predictor variable can indicate an extent to which the predictor variable can be used to accurately predict a positive or negative outcome or a likelihood of a positive or negative outcome occurring based on the predictor variable.

In some aspects, in block 304, the automated modeling application causes a relationship between each of the predictor variables and the odds index to be monotonic (e.g., using the treatment module 206 of FIG. 2). A monotonic relationship exists between the predictor variable and the odds index if a value of the odds index increases as a value of the predictor variable increases or if the value of the odds index decreases as the value the predictor variable increases.

The automated modeling application can identify or determine a set of predictor variables that have a monotonic relationship with one or more odds indices (e.g., using the predictor variable reduction module 208 of FIG. 2). In some aspects, the automated modeling application can also reject or remove predictor variables that do not have a monotonic relationship with one or more odds indices (e.g., predictor variables not included in the set).

In block 306, a neural network is generated for determining a relationship between each predictor variable and a response variable based on the correlation between each predictor variable and a positive or negative outcome (e.g., the correlation determined in block 304). The responsive variable indicates some behavior associated with the entity (e.g., a specific behavior performed by the entity, a risk indicator for the entity's behavior, etc.). Determining the relationship between a predictor variable and the response variable can include determining the relationship between the predictor variable and a modeled expected value of the response variable. In some aspects, the automated modeling application can generate the neural network using, for example, the neural network module 210 of FIG. 2.

The neural network can include input nodes corresponding to a set of predictor variables having a monotonic relationship with an associated odds index (e.g., the set of predictor variables identified in block 304). For example, the automated modeling application can generate the neural network such that the neural network models the monotonic relationship between the set of predictor variables and one or more odds indices.

The automated modeling application can generate any type of neural network. For example, the automated modeling application can generate a feed-forward neural network having a single layer of hidden nodes or multiple layers of hidden nodes. In some examples, the automated modeling application can generate the neural network based on one or more criteria or decision rules obtained from a relevant financial industry, company, etc.

Figure 4:
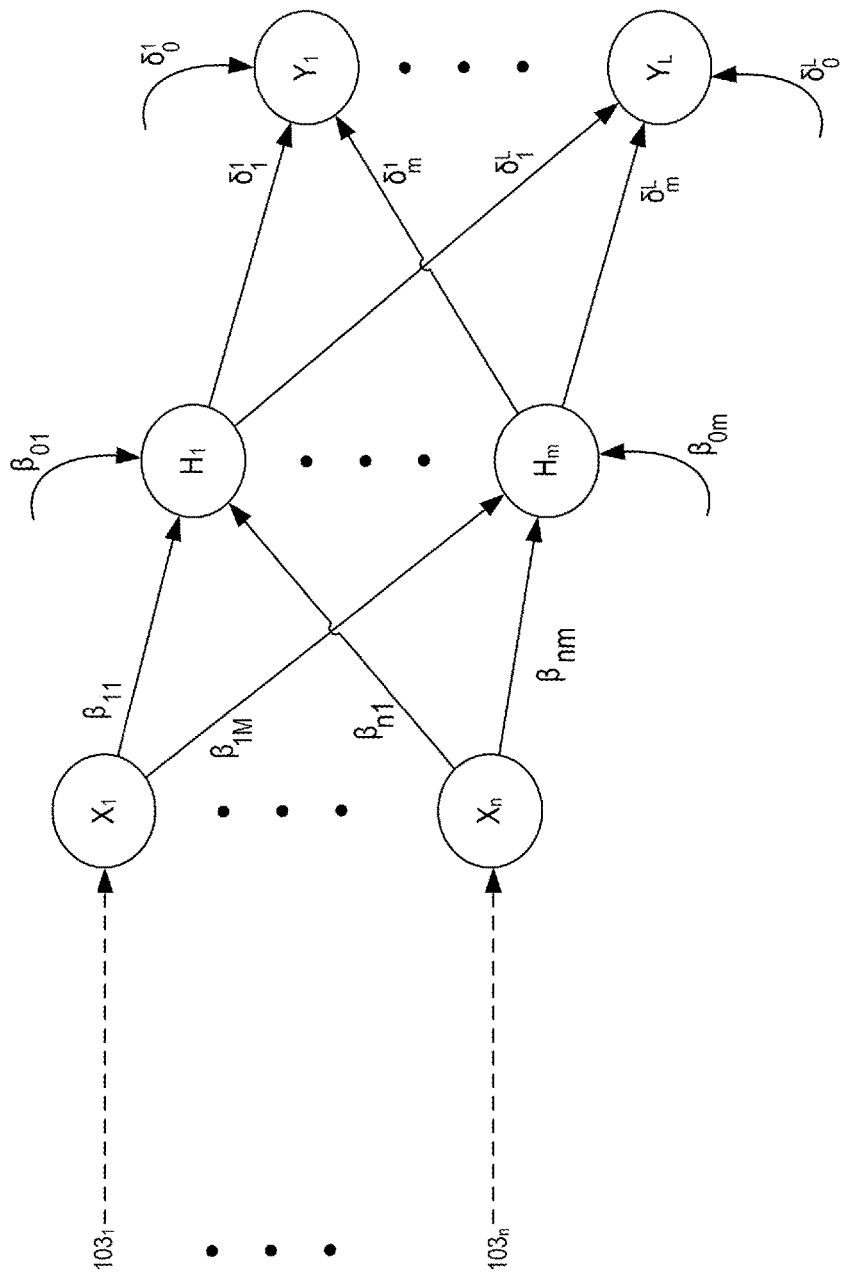
FIG. 4 is a diagram depicting an example of a single-layer neural network that can be generated and optimized by the automated modeling application of FIGS. 1 and 2, according to certain aspects of the present disclosure.

As an example, FIG. 4 is a diagram depicting an example of a single-layer neural network 400 that can be generated and optimized by the automated modeling application 102 of FIGS. 1 and 2. In the example depicted in FIG. 4, the single-layer neural network 400 can be a feed-forward single-layer neural network that includes n input predictor variables and m hidden nodes. For example, the single-layer neural network 400 includes inputs $X_1$ through $X_n$. The input nodes $X_1$ through $X_n$ represent predictor variables, which can be obtained as inputs $103_1$ through $103_n$ (e.g., from predictor variable database 103 of FIG. 1). The nodes $Y_l$, l=1, . . . , L, in FIG. 4 represents a response variable (or levels of a response variable) that can be determined using the predictor variables. The example of a single-layer neural network 400 depicted in FIG. 4 includes a single layer of hidden nodes $H_1$ through $H_m$ which represent intermediate values. But neural networks with any number of hidden layers can be optimized using the operations described herein.

In some aspects, the single-layer neural network 400 uses the predictor variables $X_1$ through $X_n$ as input values for determining the intermediate values $H_1$ through $H_m$. For example, the single-layer neural network 400 depicted in FIG. 4 uses the numeric weights or coefficients $\beta_{11}$ through $\beta_{nm}$ to determine the intermediate values $H_1$ through $H_m$ based on predictor variables $X_1$ through $X_n$. The single-layer neural network then uses numeric weights or coefficients $\delta_1^l$ through $\delta_m^l$ to determine the expected value of the response variable Y based on the intermediate values $H_1$ through $H_m$. In this manner, the single-layer neural network 400 can map the predictor variables $X_1$ through $X_n$ by receiving the predictor variables $X_1$ through providing the predictor variables $X_1$ through $X_n$ to the hidden nodes $H_1$ through $H_m$ to be transformed into intermediate values using coefficients $\beta_1^l$ through $\beta_{nm}$, transforming the intermediate variables $H_1$ through $H_m$ using the coefficients $\delta_1^l$ through $\delta_m^l$, and providing the expected value of the response variable $Y_l$.

In the single-layer neural network 400 depicted in FIG. 4, the mapping $\beta_{ij}:X_i \rightarrow H_j$ provided by each coefficient $\beta$ maps the $i^{th}$ predictor variable to the $j^{th}$ hidden node, where i has values from 0 to n and j has values from 1 to m. The mapping $\delta_j^l:H_j \rightarrow Y_l$ maps the $j^{th}$ hidden node to an output (e.g., the $l^{th}$ response level of a response variable). In the example depicted in FIG. 4, each of the hidden nodes $H_1$ through $H_m$ is modeled as a logistic function of the predictor variables $X_i$ and $E(Y_l)=f_l(H^p\delta^l)$ is a monotonic function of the hidden nodes. For example, the automated modeling application can use the following equations to represent the various nodes and operations of the single-layer neural network 400 depicted in FIG. 4:

$$H_j = \frac{1}{1 + \exp(-X\beta^j)}, \quad (1)$$

$$E(Y_l) = f_l(H^p \delta^l),$$

$$X = [1, X_1, \ldots, X_n], \quad (2)$$
$$H = [1, H_1, \ldots, H_m],$$

$$\beta^j = [\beta_{0j}, \beta_{1j}, \ldots, \beta_{nj}]^T, \quad (3)$$
$$\delta^l = [\delta_0^l, \delta_1^l, \ldots, \delta_m^l]^T.$$

The modeled output $E(Y_l)=f_l(H^p\delta^l)$ can be monotonic with respect to each of the predictor variables $X_1$ through $X_n$ in the single-layer neural network 400. In credit decision applications, the modeled output $E(Y_l)=f_l(H^p\delta^l)$ can be monotonic for each of the consumers (e.g., individuals or other entities) in the sample data set used to generate the neural network model.

In some aspects, the automated modeling application (e.g., the automated modeling application 102 of FIGS. 1 and 2) can use the single-layer neural network 400 to determine a value for the expected value of a response variable $Y_l$. As an example, in credit decision applications, the expected value of the response variable Y may be a modeled probability of a binary random variable associated with the response variable and can be continuous with respect to the predictor variables $X_1$ through $X_n$. In some aspects, the automated modeling application can use the feed-forward neural network 400 having a single hidden layer that is monotonic with respect to each predictor variable used in the neural network for generating analytical or predictive outputs. The single-layer neural network 400 can be used by the automated modeling application to determine a value for the expected value of a random variable $E(Y_l)=f_l(H^p\delta^l)$ that represents a response variable or other output probability. For example, in credit decisioning applications, $E(Y_l)=f_l(H^p\delta^l)$ may be the modeled probability of a binary random variable associated with risk, and can be continuous with respect to the predictor variables.

In some aspects, a single-layer neural network (e.g., the single-layer neural network 400 of FIG. 4) may be dense in the space of continuous functions, but residual error may exist in practical applications. For example, in credit decision applications, the input predictor variables $X_1$ through $X_n$ may not fully account for consumer behavior and may only include a subset of dimensions captured by a credit file. In some aspects, the performance of a neural network can be improved by applying a more general feed-forward neural network with multiple hidden layers.

Figure 5:
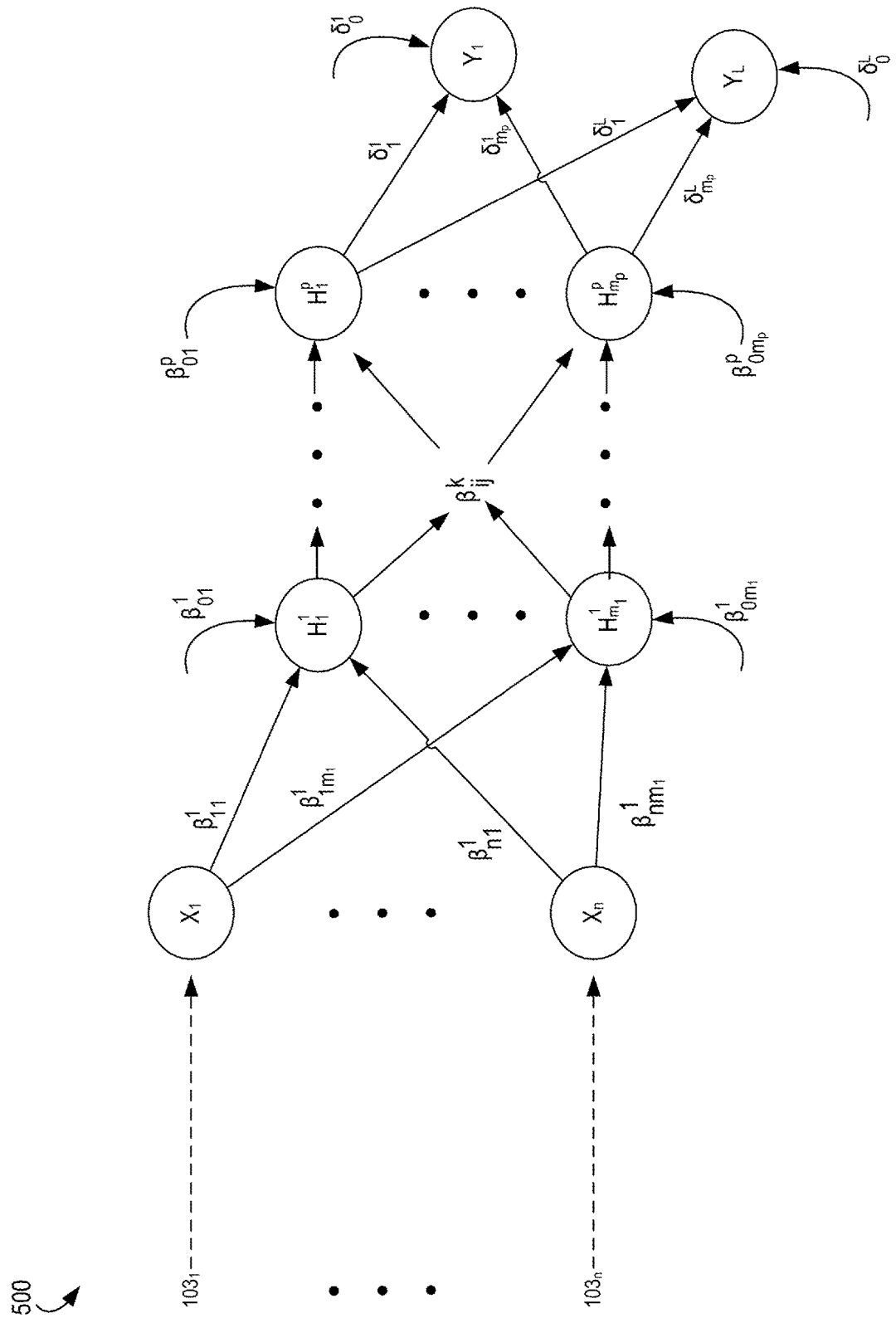
FIG. 5 is a diagram depicting an example of a multi-layer neural network that can be generated and optimized by the automated modeling application of FIGS. 1 and 2, according to certain aspects of the present disclosure.

For example, FIG. 5 is a diagram depicting an example of multi-layer neural network 500 that can be generated and optimized by the automated modeling application 102 of FIGS. 1 and 2. In the example depicted in FIG. 5, the multi-layer neural network 500 is a feed-forward neural network. The neural network 500 includes n input nodes that represent predictor variables, $m_k$ hidden nodes in the $k^{th}$ hidden layer, and p hidden layers. The neural network 500 can have any differentiable sigmoid activation function, $\varphi$: $\mathbb{R} \to \mathbb{R}$ that accepts real number inputs and outputs a real number.

Examples of activation functions include, but are not limited to, a logistic function (e.g., $1/(1+e^{-z})$), an arc-tangent function (e.g., $2/\tan^{-1}(z)$), and a hyperbolic tangent function $$\left(e.g., \ 1 - \frac{2}{1+e^{2z}}\right).$$

These activation functions are implemented in numerous statistical software packages to fit neural networks.

The input nodes $X_1$ through $X_n$ represent predictor variables, which can be obtained as inputs $103_1$ through $103_n$ (e.g., from predictor variable database 103 of FIG. 1). The node in FIG. 5 represents the $l^{th}$ level of a response variable that can be determined using the predictor variables $X_1$ through $X_n$.

In the multi-layer neural network 500, the variable $H_j^k$ can denote the $j^{th}$ node in the $k^{th}$ hidden layer. For convenience, denote $H_i^0=X_i$ and $m_o=n$. In FIG. 5, $\beta_{ij}^k:H_i^{k-1} \to H_j^k$, where $i=0, \ldots, m_{k-1}, j=1, \ldots, m_k$, and $k=1, \ldots, p$, is the mapping of the $i^{th}$ node in the $(k-1)^{th}$ layer to the $j^{th}$ node in the $k^{th}$ layer. Furthermore, $\delta_j^l:H_j^p \to Y_l$, where $j=0, \ldots, m_p$ and $l=1, \ldots, L$, is the mapping of the $j^{th}$ node in the $p^{th}$ hidden layer to the $l^{th}$ level of a response variable. The model depicted in FIG. 5 is then specified as:

$$H_j^k=\varphi(H^{k-1}\beta_j^k), E(Y_l)=f_l(H^p\delta^l), \quad (4)$$

$$H^0=X=[1, X_1, \ldots, X_n], H^k=[1, H_1^k, \ldots, H_{m_k}^k], \quad (5)$$

$$\beta_j^k=[\beta_{0j}^k, \beta_{1j}^k, \ldots, \beta_{m_{k-1}j}^k]^T, \delta^l=[\delta_0^l, \delta_1^l, \ldots, \delta_{m_p}^l]^T \quad (6)$$

In this example, $\varphi(z)$ is the activation function. Examples of activation functions include, but are not limited to, a logistic function (e.g., $1/(1+e^{-z})$), an arc-tangent function (e.g., $2/\tan^{-1}(z)$), and a hyperbolic tangent function $$\left(e.g., \ 1 - \frac{2}{1+e^{2z}}\right).$$

Similarly, an output function $f(z)$ allows a final transformation of the vector of L outputs. Examples of output functions are provided in table 1.

TABLE 1

| Distribution | f(z) |
|---|---|
| Beta | $1/(1+e^{-z})$ |
| Binomial | $1/(1+e^{-z})$ |
| Gamma | $e^z$ |
| Multinomial | $e^{z_L} / \sum_{i=1}^{L} e^{z_i}$ |
| Normal | z |
| Poisson | $e^z$ |

Similar to the embodiment in FIG. 4 described above having a single hidden layer, the modeling process of FIG. 5 can produce models of the form represented in FIG. 5 that are monotonic in every predictor variable.

Returning to FIG. 3, in block 308, a relationship between each predictor variable and a response variable is assessed. In some aspects, the automated modeling application can determine the relationship between each predictor variable and an expected value of the response variable (e.g., using the optimization module 212 of FIG. 2).

For example, the automated modeling application can determine whether the modeled score $E(Y_l)=(H^p\delta^l)$ exhibits a monotonic relationship with respect to each predictor variable $X_i$. A monotonic relationship exists between each of the predictor variables and the response variable when either: i) a value of the response variable increases as a value of each of the predictor variables increases; or ii) when the value of the response variable decreases as the value of each of the predictor variable increases. In some aspects, the automated modeling application generalizes to produce neural network models with multiple hidden layers such that the modeled score $E(Y_l)=f_l(H^p\delta^l)$ is monotonic with respect to each predictor variable.

In some aspects, in block 308, the automated modeling application can apply a coefficient method for determining the monotonicity of a relationship between each predictor and the response variable. In some aspects, the coefficient method can be used to determine how one or more predictor variables influence the credit score or other response variable. The coefficient method can ensure that a modeled relationship between the predictor variables and the credit score or response variable has a trend that matches or otherwise corresponds to a trend identified using an exploratory data analysis for a set of sample consumer data (e.g., matches a trend identified in block 304).

For example, with reference to FIG. 4, the coefficient method can be executed by the automated modeling application to determine the monotonicity of a modeled relationship between each predictor variable $X_i$ with $E(Y_l)=f_l(H^p\delta^l)$.

The coefficient method involves analyzing a change in $E(Y_l)=f_l(H^p\delta^l)$ with respect to each predictor variable X. This can allow the automated modeling application to determine the effect of each predictor variable $X_i$ on response variable $Y_l$. $E(Y_l)=f_l(H^p\delta^l)$ increases on an interval if $H\delta^l$ increases. The automated modeling application can determine whether $H\delta^l$ is increasing by analyzing a partial derivative $$\frac{\partial}{\partial X_i}(H\delta^l).$$

For example, the automated modeling application can determine the partial derivative using the following equation:

$$\frac{\partial}{\partial X_i}(H\delta^l) = \sum_{j=1}^{m} \delta_j^l \frac{\partial}{\partial X_i} H_j = \sum_{j=1}^{m} \beta_{ij}\delta_j^l \frac{\exp(-X\beta^j)}{(1+\exp(-X\beta^j))^2} \quad (7)$$

The example in equation (7) involves a single hidden layer with a logistic link function. But other implementations can be used, as described below.

A modeled score can depend upon the cumulative effect of multiple connections between a predictor variable and an expected value of a response variable (e.g. an output probability of a response variable). In the equation (7) above, the score's dependence on each $X_i$ can be an aggregation of multiple possible connections from $X_i$ to $E(Y_l)=f_l(H^p\delta^l)$. Each product $\beta_{ij}\delta_j^l$ in the summation of the equation (7) above can represent the coefficient mapping from $X_i$ to $E(Y_l)=f_l(H^p\delta^l)$ through $H_j$. The remaining term in the product of the equation above can be bounded by $$0 < \frac{\exp(-X\beta^j)}{(1+\exp(-X\beta^j))^2} \leq \frac{1}{4}.$$

In credit decision applications, this bounding can temper the effect on the contribution to points lost on each connection and can be dependent upon a consumer's position on the score surface. Contrary to traditional logistic regression scorecards, the contribution of a connection to the score $E(Y_l)=f_l(H^p\delta^l)$ may vary for each consumer since $$\frac{\exp(-X\beta^j)}{(1+\exp(-X\beta^j))^2}$$

is dependent upon the values of all the consumer's predictor variables.

If the number of hidden nodes is m=1, then the modeled score $E(Y_l)=f_l(H^p\delta^l)$ is monotonic in every predictor variable $X_i$, since equation (7) above, when set equal to 0, does not have any solutions. Therefore, $H\delta^l$ does not have any critical points. Thus, $E(Y_l)=f_l(H^p\delta^l)$ is either always increasing if the equation (7) above is positive, or always decreasing if the equation (7) above is negative, for every consumer in the sample.

The case of m=1 can be a limiting base case. A feed-forward neural network with a single hidden layer (e.g., the single-layer neural network 400 of FIG. 4) can be reduced to a model where $E(Y_l)=f_l(H^p\delta^l)$ is monotonic in each predictor variable $X_i$. Therefore, the process for optimizing the neural network, which utilizes the coefficient method described herein, can successfully terminate.

In another example and with reference to FIG. 5, similar to the aspect described for the single-layer neural network 400 of FIG. 4, the modeling process can produce models of the form represented in FIG. 5 that are monotonic in every predictor variable. A generalized version of the coefficient method described herein can be used in the automated modeling process. For example, the coefficient method can be generalized to assess the monotonicity of the modeled relationship of each predictor $X_i$ with $E(Y_l)=f_l(H^p\delta^l)$ for neural networks with the architecture described above with respect to FIG. 5. The automated modeling application is used to analyze the effect of $X_i$ on the log-odds scale score $H^p\delta^l$. The partial derivative is computed as:

$$\frac{\partial}{\partial X_i}(H^p\delta^l) = \sum_{j_p=1}^{m_p} \sum_{j_{p-1}=1}^{m_{p-1}} \sum_{j_{p-2}=1}^{m_{p-2}} \ldots \quad (8)$$

$$\sum_{j_2=1}^{m_2} \sum_{j_1=1}^{m_1} \delta_{j_p}^l \beta_{j_{p-1}j_p}^p \beta_{j_{p-2}j_{p-1}}^{p-1} \ldots \beta_{j_2j_3}^3 \beta_{j_1j_2}^2 \beta_{ij_1}^1.$$

$$\varphi'(H^{p-1}\beta_{\cdot j_p}^p)\varphi'(H^{p-2}\beta_{\cdot j_{p-1}}^{p-1}) \ldots \varphi'(H^2\beta_{\cdot j_3}^3)\varphi'(H^1\beta_{\cdot j_2}^2)\varphi'(X\beta_{\cdot j_1}^1).$$

As with single hidden layer neural networks (e.g., the single-layer neural network 400 of FIG. 4), the score's dependence on each $X_i$ is an aggregation of all possible connections from $X_i$ to $E(Y_l)=f_l(H^p\delta^l)$. Since $\varphi$ is a differentiable sigmoid function on $\mathbb{R}$, $\varphi'(x)>0$ for every $x \in \mathbb{R}$. The sign of equation (8) above depends upon a tempered aggregation of each product $\delta_{j_p}^l \beta_{j_{p-1}j_p}^p \beta_{j_{p-2}j_{p-1}}^{p-1} \ldots \beta_{j_2j_3}^3 \beta_{j_1j_2}^2 \beta_{ij_1}^1$, which maps $X_i$ to $E(Y_l)=f_l(H^p\delta^l)$ through the nodes $H_{j_1}^1, H_{j_2}^2, \ldots, H_{j_p}^p$. If $m_1=m_2=\ldots=m_p=1$, then equation (8) above, when set equal to 0, does not have any solutions. In this case, the modeled expected value $E(Y_l)=(H^p\delta^l)$ is monotonic in each predictor $X_i$. This is a limiting base case, and shows that a multiple hidden layer neural network (e.g., the multi-layer neural network 500 of FIG. 5) can be reduced to a model monotonic in each predictor. The generalized coefficient method can replace the coefficient method described above with respect to FIG. 4.

The development of a model involves numerous iterations of the automated model development process. Efficient computation and analysis of equations (7) or (8) above facilitates more robust model development for neural network architectures employing logistic activation functions, this can be attained by exploiting the symmetry of the logistic function and retaining intermediate output of the statistical software system. For example, a neural network with multiple hidden layer as depicted in FIG. 2 can have the following logistic activation function:

$$\varphi(x) = \frac{1}{1+e^{-x}}.$$

The derivative of the logistic function satisfies $$\varphi'(x)=\varphi(x)(1-\varphi(x)),$$

Equation (8) above can be computed as $$\frac{\partial}{\partial X_i}(H^p \delta^l) = \sum_{j_p=1}^{m_p} \sum_{j_{p-1}=1}^{m_{p-1}} \sum_{j_{p-2}=1}^{m_{p-2}} \cdots \qquad (9)$$

$$\sum_{j_2=1}^{m_2} \sum_{j_1=1}^{m_1} \delta_{j_p}^l \beta_{j_{p-1}j_p}^p \beta_{j_{p-2}j_{p-1}}^{p-1} \cdots \beta_{j_2 j_3}^3 \beta_{j_1 j_2}^2 \beta_{ij_1}^1.$$

$$\varphi(H^{p-1}\beta_{\cdot j_p}^p)(1-\varphi(H^{p-1}\beta_{\cdot j_p}^p))\varphi(H^{p-2}\beta_{\cdot j_{p-1}}^{p-1})$$

$$(1-\varphi(H^{p-2}\beta_{\cdot j_{p-1}}^{p-1}))\cdots \varphi(H^2\beta_{\cdot j_3}^3)(1-\varphi(H^2\beta_{\cdot j_3}^3))$$

$$\varphi(H^1\beta_{\cdot j_2}^2)(1-\varphi(H^1\beta_{\cdot j_2}^2))\varphi(X\beta_{\cdot j_1}^1)(1-\varphi(X\beta_{\cdot j_1}^1)).$$

Each term $\varphi(H^{k-1}\beta_{\cdot j_k}^k)$ in equation (9) above is captured as intermediate output in software scoring systems, which can be leveraged to achieve efficient computation of the generalized coefficient method. The order statistics of the generalized coefficient method for each predictor in the model can be analyzed. This analysis can be used to make decisions in the iterative automated model development process described above.

Returning to FIG. 3, in block 310, the automated modeling application can determine if a relationship between the predictor variables and a response variable is monotonic (e.g., in block 308). If the relationship is monotonic, the automated modeling application proceeds to block 312, described below.

If the relationship between the predictor variables and the response variable is not monotonic, in block 314 the automated modeling application adjusts the neural network (e.g., the single-layer neural network 400 of FIG. 4 or the multi-layer neural network 500 of FIG. 5) by adjusting a number of nodes in the neural network, a predictor variable in the neural network, a number of hidden layers, or some combination thereof. Adjusting the predictor variables can include eliminating the predictor variable from the neural network. Adjusting the number of nodes in the neural network can include adding or removing a node from a hidden layer in the neural network. Adjusting the number of hidden layers in the neural network can include adding or removing a hidden layer in the neural network.

In some aspects, the automated modeling application can iteratively determine if a monotonic relationship exists between the predictor variables and a response variable (e.g., in block 310) and iteratively adjust a number of nodes or predictor variables in the neural network until a monotonic relationship exists between the predictor variables and the response variable. In one example, if the predictor variables are adjusted, the process can return to block 302, and the operations associated with blocks 302, 304, 306, 308, and 310 can be performed in the iteration, as depicted in FIG. 3. In another example, if the number of nodes or hidden layers is changed, the operations associated with blocks 306, 308, and 310 can be performed in the iteration. Each iteration can involve determining a correlation between each predictor variable and a positive or negative outcome to determine if a monotonic relationship exists between the predictor variables and a response variable. The automated modeling application can terminate the iteration if the monotonic relationship exists between each of the predictor variables and the response variable, or if a relationship between each of the predictor variables and the response variable corresponds to a relationship between each of the predictor variables and an odds index (e.g., the relationship between each of the predictor variables and the odds index determined in block 304).

In block 312, the neural network can be used for various applications if a monotonic relationship exists between each predictor variable and the response variable. For example, the automated modeling application can use the neural network to determine an effect or an impact of each predictor variable on the response variable after the iteration is terminated. The automated modeling application may also determine a rank of each predictor variable based on the impact of each predictor variable on the response variable. In some aspects, the automated modeling application 102 generates and outputs an adverse action code associated with each predictor variable that indicates the effect or the amount of impact that each predictor variable has on the response variable.

Optimizing the neural network in this manner can allow the automated modeling application to use the neural network to accurately determine response variables using predictor variables and accurately determine an adverse action code impact for each of the predictor variables. In some credit applications, the automated modeling application and neural networks described herein can be used for both determining a response variable (e.g., credit score) associated with an entity (e.g., an individual) based on predictor variables associated with the entity and determining an impact or an amount of impact of the predictor variable on the response variable.

In some aspects, the automated modeling application disclosed herein can identify appropriate adverse action codes from the neural network used to determine the credit score. The automated modeling application can rank adverse action codes based on the respective influence of each adverse action code on the credit score. Every predictor variable can be associated with an adverse action code. For example, a number of delinquencies can be associated with an adverse action code.

In some aspects, the automated modeling application uses the neural network to provide adverse action codes that are compliant with regulations, business policies, or other criteria used to generate risk evaluations. Examples of regulations to which the coefficient method conforms and other legal requirements include the Equal Credit Opportunity Act ("ECOA"), Regulation B, and reporting requirements associated with ECOA, the Fair Credit Reporting Act ("FCRA"), the Dodd-Frank Act, and the Office of the Comptroller of the Currency ("OCC"). The automated modeling application may provide recommendations to a consumer based on the adverse action codes. The recommendations may indicate one or more actions that the consumer can take to improve the change the response variable (e.g., improve a credit score).

In some aspects, the neural network optimization described herein can allow an automated modeling application to extract or otherwise obtain an assignment of an adverse action code from the neural network without using a logistic regression algorithm. The neural network can be used to determine a credit score or other response variable for an individual or other entity. The automated modeling application can use the same neural network to generate both a credit score or other response variable and one or more adverse action codes associated with the credit score or other response variable. The automated modeling application can generate the neural network in a manner that allows the neural network to be used for accurate adverse action code assignment.

In some aspects, the use of optimized neural networks can provide improved performance over solutions for generating, for example, credit scores that involve modeling predictor variables monotonically using a logistic regression model. For example, in these models, these solutions may assign adverse action codes using a logistic regression model to obtain a probability p=P(Y=1) of a binary random variable Y. An example of a logistic regression model is given by the following equation:

$$\log\left(\frac{p}{1-p}\right) = f(X_1, \ldots, X_n) = X\beta = \beta_0 + X_1\beta_1 + \ldots + X_n\beta_n, \quad (10)$$

such that $$p = \frac{1}{1 + \exp(-X\beta)} \quad (11)$$

The points lost per predictor variable may then be calculated as follows. Let $x_i^m$ be the value of the predictor variable $X_i$ that maximizes $f(X_1, \ldots, x_i^m, \ldots, X_n)$. For an arbitrary function $f$, $x_i^m$ may depend on other predictor variables. However, because of the additive nature of the logistic regression model, $x_i^m$ and the points lost for the predictor variable $X_i$ do not depend upon the other predictor variables since $$f(X_1, \ldots, x_i^m, \ldots, X_n) - f(X_1, \ldots, X_i, \ldots, X_n) = \\ (\beta_0 + \beta_1 X_1 + \ldots + \beta_i x_i^m + \ldots + \beta_n X_n) - (\beta_0 + \\ \beta_1 X_1 + \ldots + \beta_i X_i + \ldots + \beta_n X_n) = \beta_i(x_i^m - X_i) \quad (12)$$

Since the logit transformation $$\log\left(\frac{p}{1-p}\right)$$

is monotonically increasing in p, the same value $x_i^m$ maximizes p. Therefore, rank-ordering points lost per predictor variable is equivalent to rank-ordering the score loss. Hence, the rank-ordering of the adverse action codes is equivalent using the log-odds scale or the probability score scale. Moreover, $f$ is either always increasing in $X_i$ if $\beta_i > 0$, or always decreasing in $X_i$ if $\beta_i < 0$, since $$\frac{\partial}{\partial X_i}(f) = \beta_i.$$

Therefore $x_i^m$ is determined from the appropriate endpoint of the domain of $X_i$ and does not depend upon the other predictor variables.

The equation (12) above may be used in contexts other than logistic regression, although the subsequent simplifications in equation (12) may no longer be applicable. For example, the automated modeling application can use the equation (12) above for any machine learning technique generating a score as $f(X_1, \ldots, X_n)$.

For neural networks, the computational complexity of equation (12) may result from determining $x_i^m$ in a closed form solution as a function of other input predictor variables. In one example, determining $x_i^m$ in a closed form solution as a function of other input predictor variables involves setting equation (7) equal to 0 and explicitly solving for $x_i^m$. Contrary to logistic regression, solving for $x_i^m$ requires numerical approximation and can be dependent upon the other predictor variables. The storage and computing requirements to generate tables of numerical approximations for $x_i^m$ for all combinations of the other predictor variables can be impractical or infeasible for a processing device.

In some aspects, the automated modeling application constrains a neural network model to agree with observed monotonic trends in the data. The value $x_i^m$ of $X_i$ that maximizes an output expected value score can be explicitly determined by one endpoint of the predictor variable $X_i$'s domain. As a result, for each consumer, equation (12) can be leveraged to rank-order a number of points lost for each predictor variable. Adverse action codes can be associated with each predictor variable and the ranking can correctly assign the key reason codes to each consumer.

The automated modeling application can thus reduce the amount of computational complexity such that the same neural network model can be used by a computer-implemented algorithm to determine a credit score and the adverse action codes that are associated with the credit score. In prior solutions, the computational complexity involved in generating a neural network model that can be used for both determining credit scores and adverse action codes may be too high to use a computer-implemented algorithm using such a neural network model. Thus, in prior solutions, it may be computationally inefficient or computationally infeasible to use the same neural network to identify adverse action codes and generate a credit score. For example, a data set used to generate credit scores may involve financial records associated with millions of consumers. Numerically approximating the location of each consumer's global maximum score is computationally intractable using current technology in a run-time environment.

Figure 6:
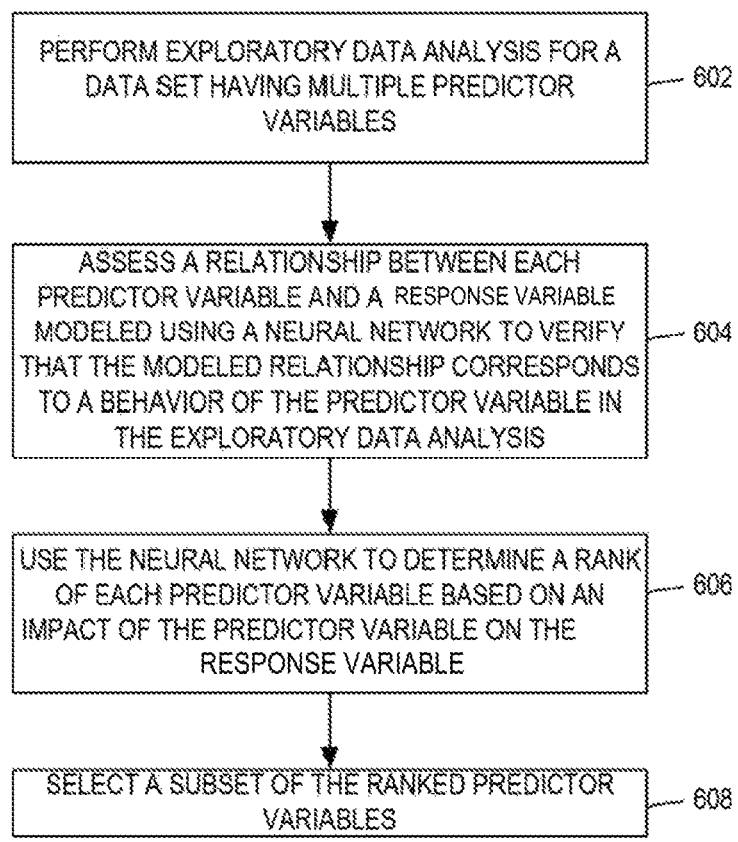
FIG. 6 is a flow chart depicting an example of a process for using a neural network, which can be generated and optimized by the automated modeling application of FIGS. 1 and 2, to identify predictor variables with larger impacts on a risk indicator, a prediction of entity behavior, or another response variable, according to certain aspects of the present disclosure.

FIG. 6 is a flow chart depicting an example of a process for using a neural network to identify predictor variables with larger impacts on a response variable according to certain aspects of the present disclosure.

In block 602, an exploratory data analysis is performed for a data set having multiple predictor variables. In some aspects, an automated modeling application (e.g., the automated modeling application 102 of FIG. 1) or another suitable application can be used to perform the exploratory data analysis. The exploratory data analysis can involve analyzing a distribution of one or more predictor variables and determining a bivariate relationship or correlation between the predictor variable and some sort of response variable.

In block 604, a relationship between each predictor variable and a response variable, which is modeled using a neural network, is assessed to verify that the modeled relationship corresponds to a behavior of the predictor variable in the exploratory data analysis. In some aspects, an automated modeling application (e.g., the automated modeling application 102 of FIG. 1) or another suitable application can be used to perform one or more operations for implementing block 604. For example, the automated modeling application can perform one or more operations described above with respect to FIG. 3 for assessing the monotonicity of a relationship between a relationship between each predictor variable and a response variable as modeled using the neural network. The automated modeling application can be used to optimize or otherwise adjust a neural network such that the modeled relationship between the predictor variable and the response variable is monotonic, and therefore corresponds to the observed relationship between the predictor variable and the response variable in the exploratory data analysis.

In block 606, the neural network is used to determine a rank of each predictor variable based on an impact of the predictor variable on the response variable. In some aspects, an automated modeling application (e.g., the automated modeling application 102 of FIG. 1) or another suitable application can rank the predictor variables based on according to the impact of each predictor variable on the response variable. The automated modeling application can determine the ranks by performing one or more operations described above.

In block 608, a subset of the ranked predictor variables is selected. In some aspects, an automated modeling application (e.g., the automated modeling application 102 of FIG. 1) or another suitable application can select the subset of ranked predictor variables. For example, the automated modeling application can select a certain number of highest-ranked predictor variables (e.g., the first four predictor variables).

Figure 7:
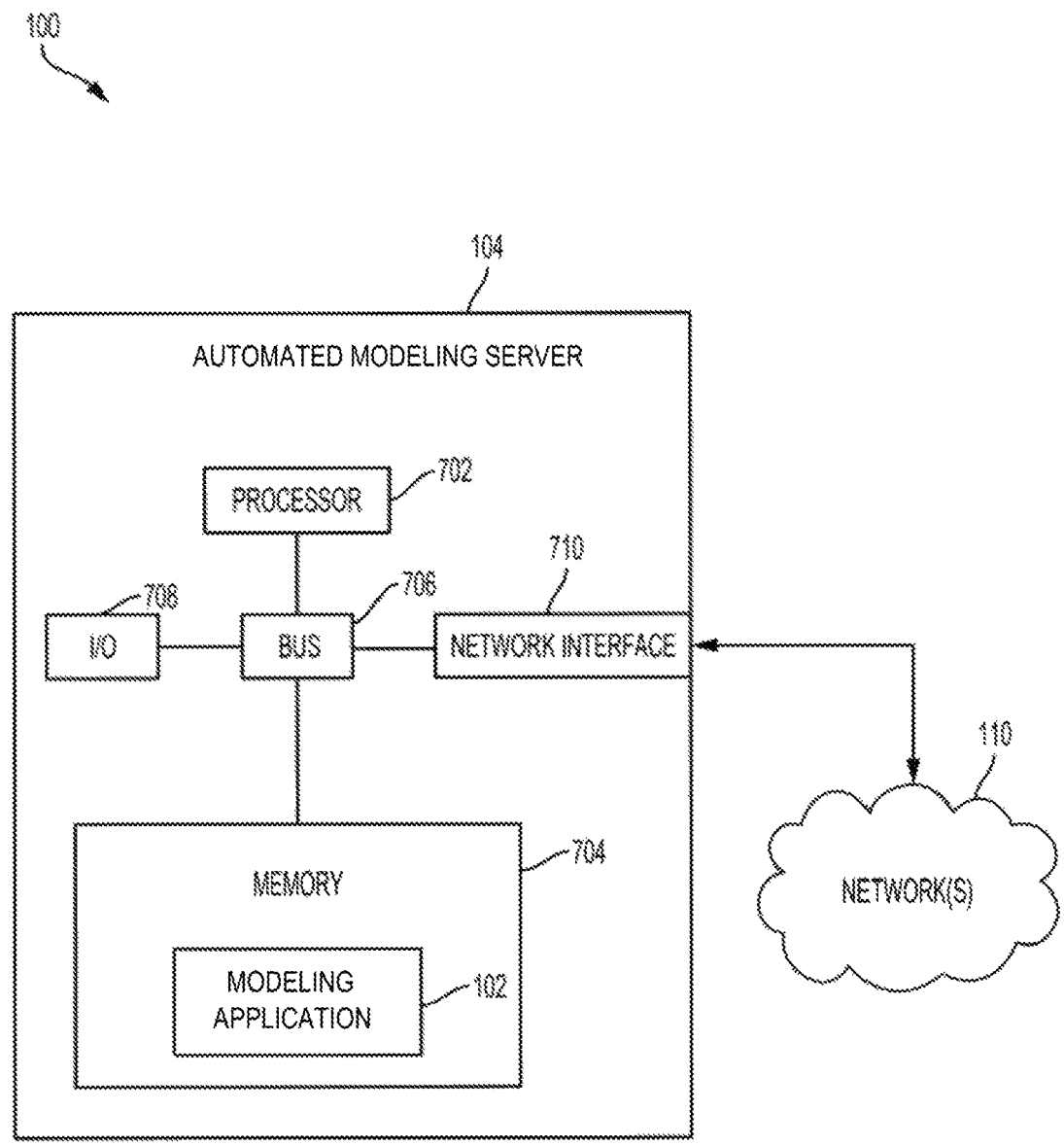
FIG. 7 is a block diagram depicting an example of a computing system that can be used to execute an application for optimizing a neural network for generating analytical or predictive outputs according to certain aspects of the present disclosure.

Any suitable device or set of computing devices can be used to execute the automated modeling application described herein. For example, FIG. 7 is a block diagram depicting an example of an automated modeling server 104 (e.g., the automated modeling server 104 of FIG. 1) that can execute an automated modeling application 102. Although FIG. 7 depicts a single computing system for illustrative purposes, any number of servers or other computing devices can be included in a computing system that executes an automated modeling application. For example, a computing system may include multiple computing devices configured in a grid, cloud, or other distributed computing system that executes the automated modeling application 102.

The automated modeling server 104 can include a processor 702 that is communicatively coupled to a memory 704 and that performs one or more of executing computer-executable program instructions stored in the memory 704 and accessing information stored in the memory 704. The processor 702 can include one or more microprocessors, one or more application-specific integrated circuits, one or more state machines, or one or more other suitable processing devices. The processor 702 can include any of a number of processing devices, including one. The processor 702 can include or may be in communication with a memory 704 that stores program code. When executed by the processor 702, the program code causes the processor to perform the operations described herein.

The memory 704 can include any suitable computer-readable medium. The computer-readable medium can include any electronic, optical, magnetic, or other storage device capable of providing a processor with computer-readable program code. Non-limiting examples of a computer-readable medium include a CD-ROM, DVD, magnetic disk, memory chip, ROM, RAM, an ASIC, a configured processor, optical storage, magnetic tape or other magnetic storage, or any other medium from which a computer processor can read instructions. The program code may include processor-specific instructions generated by a compiler or an interpreter from code written in any suitable computer-programming language, including, for example, C, C++, C #, Visual Basic, Java, Python, Perl, JavaScript, ActionScript, and PMML.

The automated modeling server 104 may also include, or be communicatively coupled with, a number of external or internal devices, such as input or output devices. For example, the automated modeling server 104 is shown with an input/output ("I/O") interface 708 that can receive input from input devices or provide output to output devices. A bus 706 can also be included in the automated modeling server 104. The bus 706 can communicatively couple one or more components of the automated modeling server 104.

The automated modeling server 104 can execute program code for the automated modeling application 102. The program code for the automated modeling application 102 may be resident in any suitable computer-readable medium and may be executed on any suitable processing device. The program code for the automated modeling application 102 can reside in the memory 704 at the automated modeling server 104. The automated modeling application 102 stored in the memory 704 can configure the processor 702 to perform the operations described herein.

The automated modeling server 104 can also include at least one network interface 110 for communicating with the network 110. The network interface 710 can include any device or group of devices suitable for establishing a wired or wireless data connection to one or more data networks 110. Non-limiting examples of the network interface 710 include an Ethernet network adapter, a modem, or any other suitable communication device for accessing a data network 110. Examples of a network 110 include the Internet, a personal area network, a local area network ("LAN"), a wide area network ("WAN"), or a wireless local area network ("WLAN"). A wireless network may include a wireless interface or combination of wireless interfaces. As an example, a network in the one or more networks 110 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 110. The network 110 can be incorporated entirely within or can include an intranet, an extranet, or a combination thereof. In one example, communications between two or more systems or devices in the computing environment 100 can be achieved by a secure communications protocol, such as secure sockets layer ("SSL") or transport layer security (TLS). In addition, data or transactional details may be encrypted.

The foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

What is claimed is:

1. A system comprising:
a processing device; and
a memory device in which instructions executable by the processing device are stored for causing the processing device to:
receive a plurality of predictor variables, wherein each predictor variable corresponds to an entity;
determine a correlation between each predictor variable and an outcome;
generate a neural network that includes a hidden layer for determining a relationship between each predictor variable and a response variable based on the correlation, wherein the response variable indicates a behavior associated with the entity and wherein the neural network is operable for determining whether a monotonic relationship exists between each predictor variable and the response variable;
iteratively adjust the neural network so that the monotonic relationship exists between each predictor variable and the response variable as determined by the neural network, wherein adjusting the neural network comprises adjusting at least one of a number of nodes in the hidden layer of the neural network, a predictor variable in the plurality of predictor variables, or a number of hidden layers in the neural network, and wherein the processing device is configured to determine, based on a rate of change of the response variable with respect to the predictor variable, that the monotonic relationship exists between each predictor variable and the response variable;
determine, using the neural network, the response variable based at least partially on the predictor variables after the monotonic relationship exists between each predictor variable and the response variable;
determine, using the neural network, an impact of each predictor variable on the response variable; and
generate, using the neural network, an adverse action code associated with each predictor variable that indicates the impact of each predictor variable on the response variable.

2. The system of claim 1, wherein the hidden layer comprises at least two hidden layers.

3. The system of claim 1, wherein the processing device is configured to determine the correlation between each predictor variable and an outcome by determining a correlation between each predictor variable and an amount of positive outcomes or negative outcomes, wherein each positive outcome indicates that a condition is satisfied and each negative outcome indicates failure to satisfy the condition.

4. The system of claim 3, wherein the processing device is configured to determine the correlation between each predictor variable and the amount of positive outcomes or negative outcomes by performing operations comprising verifying that a bivariate relationship exists between each predictor variable and the amount of positive outcomes or negative outcomes.

5. The system of claim 1, wherein the processing device is further configured to determine a rank of each predictor variable, using the neural network, based on the impact of each predictor variable on the response variable.

6. The system of claim 1, wherein the response variable corresponds to a credit score of the entity.

7. A method comprising:
receiving, by a processor, a plurality of predictor variables, wherein each predictor variable corresponds to an entity;
determining, by the processor, a correlation between each predictor variable and an amount of positive outcomes or negative outcomes, wherein each positive outcome indicates that a condition is satisfied and each negative outcome indicates failure to satisfy the condition;
generating, by the processor, a neural network that includes a hidden layer for determining a relationship between each predictor variable and a response variable based on the correlation, wherein the response variable is indicates a behavior associated with the entity; and
iteratively adjusting the neural network so that a monotonic relationship exists between each predictor variable and the response variable as determined by the neural network.

8. The method of claim 7, wherein iteratively adjusting the neural network includes determining whether the monotonic relationship exists between each predictor variable and the response variable.

9. The method of claim 7, wherein adjusting the neural network includes adjusting at least one of a number of nodes in the hidden layer of the neural network, a predictor variable in the plurality of predictor variables, or a number of hidden layers in the neural network, wherein the method further comprises:
determining, using the neural network, the response variable based at least partially on the predictor variables after the monotonic relationship exists between each predictor variable and the response variable;
determining, based on a rate of change of the response variable with respect to the predictor variable, that the monotonic relationship exists between each predictor variable and the response variable;
determining, using the neural network, an impact of each predictor variable on the response variable;
determining, using the neural network, an adverse action code associated with each predictor variable that indicates the impact of each predictor variable on the response variable; and
determining, using the neural network, a rank of each predictor variable based on the impact of each predictor variable on the response variable.

10. The method of claim 9, further comprising outputting, by the processor, the response variable, each predictor variable, the adverse action code associated with each predictor variable, and the rank of each predictor variable.

11. The method of claim 9, wherein the hidden layer comprises at least two hidden layers.

12. The method of claim 7, wherein determining the correlation between each predictor variable and the amount of positive outcomes or negative outcomes includes verifying that a bivariate relationship exists between each predictor variable and the amount of positive outcomes or negative outcomes.

13. A non-transitory computer-readable storage medium having program code that is executable by a processor device to cause the processor device to perform operations, the operations comprising:
receiving a plurality of predictor variables, wherein each predictor variable corresponds to an entity;
determining a correlation between each predictor variable and an amount of positive outcomes or negative outcomes, wherein each positive outcome indicates that a condition is satisfied and each negative outcome indicates failure to satisfy the condition;
generating a neural network that includes a hidden layer for determining a relationship between each predictor variable and a response variable based on the correlation, wherein the response variable indicates a behavior associated with the entity and wherein the neural network is operable for determining whether a monotonic relationship exists between each predictor variable and the response variable; and
iteratively adjusting the neural network so that the monotonic relationship exists between each predictor variable and the response variable as determined by the neural network.

14. The non-transitory computer-readable storage medium of claim 13, wherein the operations further comprise:
adjusting the neural network by adjusting at least one of a number of nodes in the hidden layer of the neural network, a predictor variable in the plurality of predictor variables, or a number of hidden layers in the neural network;
determining, using the neural network, the response variable based at least partially on the predictor variables after the monotonic relationship exists between each predictor variable and the response variable;

determining, based on a rate of change of the response variable with respect to the predictor variable, that the monotonic relationship exists between each predictor variable and the response variable;

determining, using the neural network, an impact of each predictor variable on the response variable; and generating, using the neural network, an adverse action code associated with each predictor variable that indicates the impact of each predictor variable on the response variable.

15. The non-transitory computer-readable storage medium of claim 14, wherein the operations further comprise determining, using the neural network, a rank of each predictor variable based on the impact of each predictor variable on the response variable.

16. The non-transitory computer-readable storage medium of claim 15, wherein the operations further comprise selecting, using the neural network, a subset of the predictor variables based on the ranks of the selected subset of the predictor variables.

17. The non-transitory computer-readable storage medium of claim 16, wherein the operations further comprise outputting, by the processor device, the response variable, each predictor variable, the adverse action code associated with each predictor variable, and the rank of each predictor variable.

18. The non-transitory computer-readable storage medium of claim 15, wherein the hidden layer comprises at least two hidden layers.

19. The non-transitory computer-readable storage medium of claim 13, wherein the operations further comprise determining the correlation between each predictor variable and the amount of positive outcomes or negative outcomes by verifying that a bivariate relationship exists between each predictor variable and the amount of positive outcomes or negative outcomes.

* * * * *